United States Patent
Hansen et al.

(10) Patent No.: US 11,789,507 B1
(45) Date of Patent: *Oct. 17, 2023

(54) PRE-COOLING A BATTERY ENERGY STORAGE SYSTEM FOR CHARGING OR DISCHARGING

(71) Applicant: 8ME NOVA, LLC, El Dorado Hills, CA (US)

(72) Inventors: Lukas Hansen, El Dorado Hills, CA (US); Nadim Kanan, Elk Grove, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,111

(22) Filed: Mar. 1, 2023

Related U.S. Application Data

(63) Continuation of application No. 17/945,569, filed on Sep. 15, 2022, now Pat. No. 11,604,499, which is a continuation of application No. 17/853,652, filed on Jun. 29, 2022, now Pat. No. 11,481,010.

(51) Int. Cl.
G06F 1/32 (2019.01)
G06F 1/20 (2006.01)
G06F 1/3212 (2019.01)
G06F 1/16 (2006.01)

(52) U.S. Cl.
CPC ............ *G06F 1/206* (2013.01); *G06F 1/1635* (2013.01); *G06F 1/3212* (2013.01)

(58) Field of Classification Search
CPC .................................... G06F 1/32; G06F 9/44
See application file for complete search history.

(56) References Cited

U.S. PATENT DOCUMENTS

| | | |
|---|---|---|
| 2018/0072183 A1 | 3/2018 | Nomura |
| 2018/0262019 A1 | 9/2018 | Homma |
| 2019/0207406 A1 | 7/2019 | Matthey et al. |
| 2019/0361513 A1 | 11/2019 | Tomoda et al. |
| 2020/0243925 A1 | 7/2020 | Polakowski et al. |
| 2021/0096619 A1* | 4/2021 | Wang ...................... G06F 1/206 |
| 2021/0354591 A1 | 11/2021 | Iida et al. |
| 2022/0203863 A1* | 6/2022 | Wu .......................... B60L 58/26 |
| 2023/0133437 A1* | 5/2023 | Kang ................. H05K 7/20154 320/107 |

* cited by examiner

*Primary Examiner* — Keshab R Pandey
(74) *Attorney, Agent, or Firm* — Foley & Lardner LLP

(57) ABSTRACT

The present disclosure provides systems and methods for managing a temperature of a battery energy storage system ("BESS"). A method may comprise obtaining a charge/discharge schedule for a battery energy storage system (BESS) for a first time period; identifying, from the charge/discharge schedule, a charge or discharge time period of the BESS within the first time period; calculating a beginning time of a temperature control time period in which equipment operates to control a temperature of the BESS to reach a target temperature by a beginning time of the charge or discharge time period; and controlling the equipment operating to control the temperature of the BESS for the temperature control time period such that the temperature of the BESS reaches the target temperature by the beginning time of the charge or discharge time period.

14 Claims, 9 Drawing Sheets

PRE-COOLING A BATTERY ENERGY STORAGE SYSTEM FOR CHARGING OR DISCHARGING

CROSS-REFERENCE TO RELATED APPLICATIONS

This application claims benefit of and priority to as a continuation to U.S. patent application Ser. No. 17/945,569, filed Sep. 15, 2022, which is a continuation of U.S. patent application Ser. No. 17/853,652, filed Jun. 29, 2022, the entirety of which is incorporated by reference herein.

BACKGROUND

Several industrial applications may implement the use of a battery energy storage system ("BESS") for the use of storing, and later providing, electrical energy. A BESS may have a limited operating temperature range in order to protect the expected useful life of the battery cells and prevent battery fires.

During charging and discharging, battery cell temperatures tend to rise as a result of the resistive losses and can generate substantial amounts of heat. Thermal management systems operate to prevent the cell temperature from rising to any level that can impact the batteries negatively. Even when the battery is neither charging nor discharging, it may be optimal to use thermal management systems to control the battery temperature, if the environmental temperature is above or below the target range for the battery temperature. Thermal management systems may require a large amount of energy to maintain a BESS within operating temperature limitations, particularly when doing so as the BESS is charging or discharging.

SUMMARY

Operating a thermal management system to cool a BESS in a renewable energy plant as the BESS is charging or discharging can often strain the renewable energy plant. For instance, charging or discharging the BESS while providing energy to an energy grid and operating temperature control equipment (e.g., heating, ventilation, and/or air conditioning equipment) to cool the BESS requires the BESS to be oversized to serve the temperature control equipment while still delivering the nominal power rating to the grid. This increases system expense and causes more cycles on the batteries, which reduces system efficiency and lifespan.

A processor implementing the systems and methods discussed herein may overcome the aforementioned technical deficiencies by pre-cooling the BESS using temperature control equipment in preparation of charging or discharging the BESS. The processor may pre-cool or pre-heat the BESS such that the temperature of the BESS remains within an acceptable temperature range during charging or discharging without any temperature control equipment operating concurrently. To do so, the processor may first identify an upcoming charge or discharge time period of the BESS. The processor may identify the charge or discharge time period from a charge/discharge schedule as a planned charge or discharge time period or an estimated charge or discharge time period in which the BESS will be configured to be in standby mode in case the BESS is called to charge or discharge. The processor may then calculate a projected temperature increase of the BESS for the charge or discharge time period. The processor may calculate the increase based on the length of the charge or discharge time period and/or a model of BESS temperature increase while charging or discharging. The processor may use the calculated increase to identify a target temperature for the BESS at the beginning of the charge or discharge time period such that the BESS may charge or discharge within an acceptable temperature range without any temperature control equipment operating to heat or cool the BESS at the same time.

After identifying the target temperature for the beginning of the charge or discharge time period, the processor may calculate the time period (e.g., the duration and beginning time) for the temperature control equipment to operate to bring the BESS to the target temperature by the beginning of the charge or discharge time period. The processor may either identify the current temperature of the BESS or predict what the temperature of the BESS will be at a set time before the charge or discharge time period. The processor may do so by executing a thermal model. The processor may also calculate the expected temperature change of the BESS that will result from operation of the temperature control equipment. From the identified current or predicted temperature of the BESS and the average temperature change caused by the temperature control equipment, the processor may calculate a length of time in which the temperature control equipment needs to operate to bring the temperature of the BESS to the target temperature for the charge or discharge time period. The processor may subtract the length from the beginning time of the charge or discharge time period to identify the beginning time of the temperature control time period. The processor may transmit a signal to the temperature control equipment at the beginning of the temperature control time period to cause the equipment to begin operating to affect (e.g., heat or cool) the temperature of the BESS.

In some cases, to energize the equipment that operates to control the temperature of the BESS, the processor may use energy from a co-located renewable energy power plant that would have otherwise been curtailed (a.k.a. "clipped") because it could not be exported to the grid beyond the common connection point to the BESS. For example, in a renewable energy power plant, one or more solar panels may be configured to generate energy and provide the energy to various loads and/or an energy grid. However, the control system may be configured to clip or limit the amount of energy the solar panel generates, in some cases as a result of having a project substation that is not rated to export all of the energy the solar panels generate. The processor may take advantage of the clipped energy by increasing the max renewable energy power plant generation setting by the amount of energy that is needed to energize the temperature control equipment for the temperature control time period. The processor may increase the limit and direct the previously clipped energy to the temperature control equipment, thereby enabling the renewable energy power plant to pre-cool or pre-heat the BESS using energy that would have been lost to curtailment instead of adding more batteries to supply the temperature control equipment.

Advantageously, by performing the systems and methods described herein, the processor may improve the health and/or lifespan of the BESS using the pre-heating or pre-cooling techniques. By operating the temperature control equipment prior to the charge or discharge period, the temperature control equipment may not need to operate during the charge or discharge period itself. Avoiding operating the temperature control equipment during the charge period can be used to beneficially cause the BESS to charge faster or more efficiently. Avoiding operating the temperature control equipment during the discharge period can be used to beneficially reduce the number of batteries needed in the BESS to supply these loads and reduce the energy throughput of the system and/or the BESS may increase the system or the BESS's lifespan.

Additionally, by using clipped energy, the system may not rely on energy from the energy grid to operate the temperature control equipment. This may be advantageous because, in most cases, energy storage systems are expected to discharge when the energy grid is at peak load and stressed in ensuring it is providing enough energy to satisfy the loads of multiple consumers (e.g., during the evenings and other times in which people typically use a significant amount of energy). By using the clipped energy that would have otherwise been available, energy can be used more efficiently without requiring entirely new renewable energy resources (e.g., without installing more solar panels and energy storage systems) or energy from the grid at peak hours.

In an aspect, the present disclosure describes a method for managing a temperature of a battery energy storage system ("BESS"). The method may comprise obtaining, by a processor, a charge/discharge schedule for a battery energy storage system (BESS) for a first time period; identifying, by the processor from the charge/discharge schedule, a charge or discharge time period of the BESS within the first time period; calculating, by the processor, a beginning time of a temperature control time period in which equipment operates to control a temperature of the BESS to reach a target temperature by a beginning time of the charge or discharge time period; and controlling, by the processor, the equipment operating to control the temperature of the BESS for the temperature control time period such that the temperature of the BESS reaches the target temperature by the beginning time of the charge or discharge time period.

In some embodiments, calculating the beginning time of the temperature control time period comprises identifying, by the processor, a temperature change rate of the BESS when the equipment operates to control the temperature of the BESS; identifying, by the processor, a current temperature of the BESS; and calculating, by the processor, the beginning time of the temperature control time period based on the temperature change rate, the current temperature of the BESS, and the target temperature.

In some embodiments, calculating the beginning time of the temperature control time period comprises identifying, by the processor, a temperature change rate of the BESS when the equipment operates to control the temperature of the BESS; calculating, by the processor, the temperature of the BESS at an end of a second charge or discharge time period of the BESS prior to the charge or discharge time period of the BESS; and calculating, by the processor, the beginning time of the temperature control time period based on the temperature change rate, the calculated temperature of the BESS at the end of the second charge or discharge time period, and the target temperature.

In some embodiments, calculating the beginning time of the temperature control time period comprises calculating, by the processor, the target temperature of the BESS based on a BESS temperature maximum and a predicted temperature increase of the BESS during the charge or discharge time period. In some embodiments, controlling the equipment operating to control the temperature of the BESS for the temperature control time period comprises adjusting, by the processor, a state of operation of the equipment; measuring, by the processor, an increase in energy requirements of the equipment based on the adjusted state of operation; and increasing, by the processor, a maximum energy output of a solar panel based on the measured increase in energy requirements of the temperature control equipment.

In some embodiments, controlling the equipment operating to control the temperature of the BESS for the temperature control time period further comprises directing, by the processor from the solar panel, an amount of energy substantially equal to the increase in the maximum energy output of the solar panel to the equipment operating to control the temperature of the BESS. In some embodiments, the method further comprises determining, by the processor, the amount of energy is not enough energy to enable the equipment to operate to control the temperature of the BESS to reach the target temperature; and responsive to the determining, directing, by the processor, additional energy to the temperature control equipment.

In some embodiments, the method further comprises calculating, by the processor, a difference between the energy requirements of the equipment and the increase in the maximum energy output of the renewable energy generator (e.g. solar panel, wind turbine other renewable source), wherein directing energy from the energy grid or the BESS to the equipment comprises directing, by the processor, an amount of energy substantially equal to the difference to the equipment. In some embodiments, the method further comprises identifying, by the processor, an energy loss between a photovoltaic energy meter and a meter coupled to an energy grid, wherein increasing the maximum energy output of the solar panel comprises setting, by the processor, an energy output of the renewable energy generator panel to compensate for the expected energy loss between the renewable generator and the curtailment point.

In some embodiments, controlling the equipment operating to control the temperature of the BESS for the temperature control time period comprises controlling, by the processor, the equipment to cool the BESS to the target temperature. In some embodiments, the method further comprises maintaining, by the processor, an internal clock measuring a current time, wherein controlling the equipment operating to control the temperature of the BESS comprises adjusting, by the processor, the equipment from an off state to an on state at the beginning time of the temperature control time period in response to determining the current time is equal to the calculated beginning time of the temperature control period.

In some embodiments, the BESS temperature control system may implement simplified logic wherein it does not attempt to actively predict when is the discharging period but assumes a discharge will follow every charge period within a period of time that would typically benefit from pre-cooling the BESS to a lower target temperature during the charge period. In this simplified embodiment past temperature rise behavior would be used to estimate a target temperature during the charge period and the target temperature would be raised either at the end of the charge period or the beginning of the discharge period in order to reduce the energy consumed from BESS by the temperature control system during the discharge period.

In another aspect, the present disclosure describes a system for managing a temperature of a battery energy storage system ("BESS"). The system may comprise a processor, the processor operatively coupled to computer memory and configured by machine-readable instructions to obtain a charge/discharge schedule for a battery energy storage system (BESS) for a first time period; identify, from the charge/discharge schedule, a charge or discharge time period of the BESS within the first time period; calculate a beginning time of a temperature control time period in which equipment operates to control a temperature of the BESS to reach a target temperature by a beginning time of the charge or discharge time period; and control the equipment operating to control the temperature of the BESS for the temperature control time period such that the temperature of the BESS reaches the target temperature by the beginning time of the charge or discharge time period.

In some embodiments, the processor is configured to calculate the beginning time of the temperature control time period by identifying a temperature change rate of the BESS when the equipment operates to control the temperature of the BESS; identifying a current temperature of the BESS; and calculating the beginning time of the temperature control time period based on the temperature change rate, the current temperature of the BESS, and the target temperature. In some embodiments, the processor is configured to calculate the beginning time of the temperature control time period by identifying a temperature change rate of the BESS when the equipment operates to control the temperature of the BESS; calculating the temperature of the BESS at an end of a second charge or discharge time period of the BESS prior to the charge or discharge time period of the BESS; and calculating the beginning time of the temperature control time period based on the temperature change rate, the calculated temperature of the BESS at the end of the second charge or discharge time period, and the target temperature.

In some embodiments, the processor is configured to calculate the beginning time of the temperature control time period by calculating the target temperature of the BESS based on a BESS temperature maximum and a predicted temperature increase of the BESS during the charge or discharge time period. In some embodiments, the processor is configured to control the equipment operating to control the temperature of the BESS for the temperature control time period by adjusting a state of operation of the equipment; measuring an increase in energy requirements of the equipment based on the adjusted state of operation; and increasing a maximum energy output of a solar panel based on the measured increase in energy requirements of the equipment.

In some embodiments, the processor is configured to control the equipment operating to control the temperature of the BESS for the temperature control time period further by directing, from the solar panel, an amount of energy substantially equal to the increase in the maximum energy output of the solar panel to the equipment operating to control the temperature of the BESS. In some embodiments, the processor is further configured to determine the amount of energy is not enough energy to enable the equipment to operate to control the temperature of the BESS to reach the target temperature; and responsive to the determination, direct energy from an energy grid or the BESS to the equipment. In some embodiments, the processor is further configured to calculate a difference between the energy requirements of the equipment and the increase in the maximum energy output of the solar panel, wherein the processor is configured to direct energy from the energy grid or the BESS to the equipment by directing an amount of energy substantially equal to the difference to the equipment.

In another aspect, the present disclosure describes a non-transitory computer readable medium for managing a temperature of a battery energy storage system ("BESS"). The non-transitory computer readable medium may comprise instructions that, when executed by a processor, cause the processor to obtain a charge/discharge schedule for a battery energy storage system (BESS) for a first time period; identify, from the charge/discharge schedule, a charge or discharge time period of the BESS within the first time period; calculate a beginning time of a temperature control time period in which equipment operates to control a temperature of the BESS to reach a target temperature by a beginning time of the charge or discharge time period; and control the equipment operating to control the temperature of the BESS for the temperature control time period such that the temperature of the BESS reaches the target temperature by the beginning time of the charge or discharge time period.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

Figure 1A:
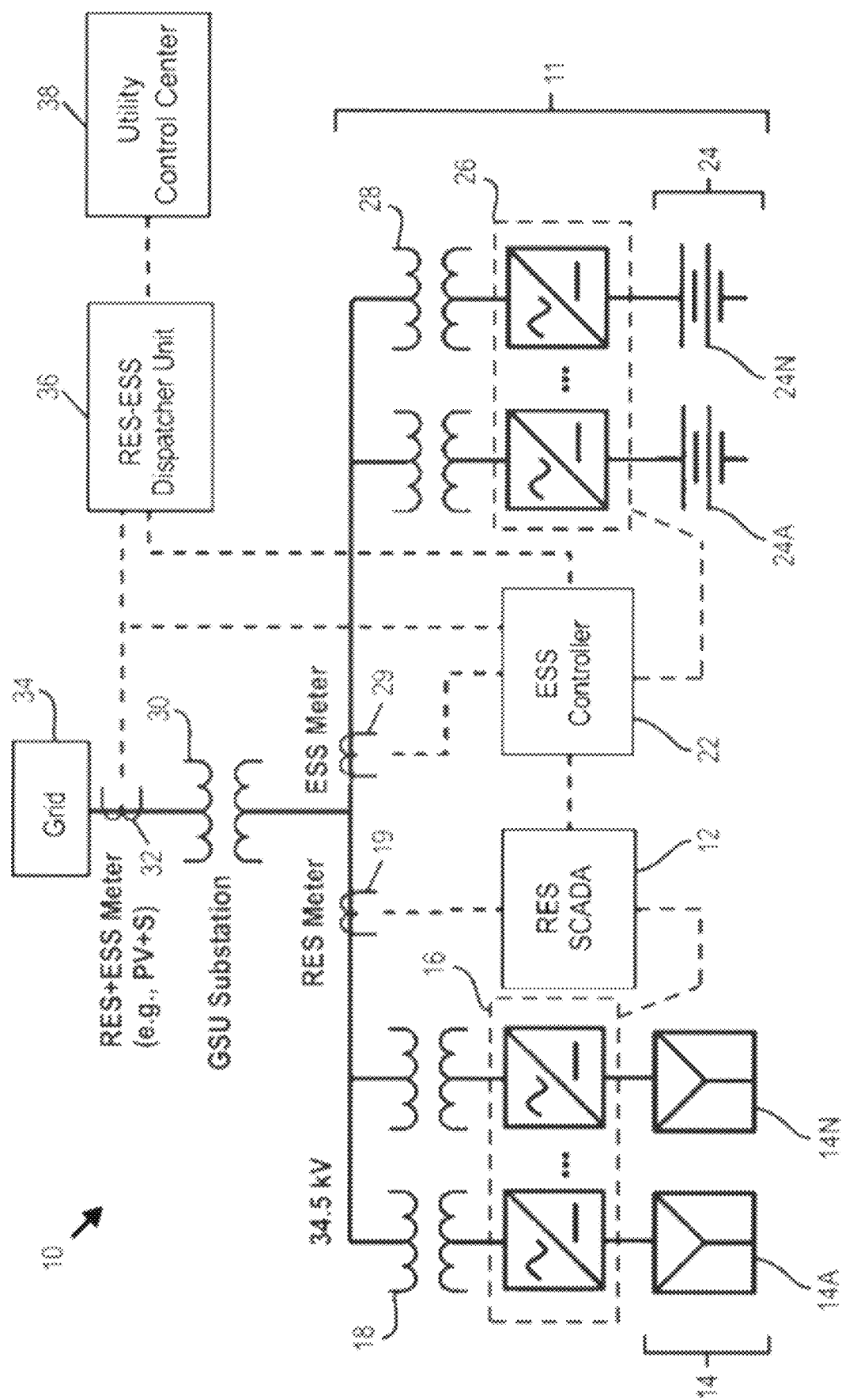
FIG. 1A is a schematic diagram of a metering and control system for controlling a renewable energy source and an energy storage system, according to some embodiments.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

BESS Thermal Management System

Referring now to FIG. 1A, a schematic diagram showing interconnections between various components of an AC coupled metering and control system 10 for controlling a renewable electrical energy generation device 14 including multiple generation units 14A-14N (such as a photovoltaic (PV) array including photovoltaic units) and an energy storage device 24 including multiple energy storage units 24A-24N (such as a battery array including battery units) chargeable with electric power produced by the renewable electrical energy generation device 14 in a RES-ESS facility 11 is shown, according to one embodiment. The RES-ESS facility 11 may combine a renewable electrical energy generation device 14 (e.g., such as an array of PV panels, wind turbines, or the like), and an energy storage device 24 (e.g., an array of lithium-based batteries) that may be coupled to a single substation 30 and/or located in a single property, area, or structure.

FIG. 1A illustrates an RES-ESS facility 11 that uses inverters 16, 26 to convert DC power produced by a renewable electrical energy generation device 14 (e.g., a PV array in certain embodiments) or power released by the energy storage device 24 to AC power for coupling to an AC electrical grid 34. In certain embodiments, the RES-ESS facility 11 may embody a DC coupled RES-ESS facility. In certain embodiments, an energy storage device 24 may include at least one of (or a combination of) energy storage units 24A, 24B using various constructions and chemistries, capacitors, or mechanical energy storage devices such as flywheels or pumped-hydro installations. In certain embodiments, an energy storage device 24 may include at least one hydrolysis unit (e.g., configured to electrolyze water to release hydrogen) and a hydrogen storage unit (e.g., adsorbent media for releasably binding hydrogen, storage vessels, and/or reversible chemical reactant vessels or beds). In certain embodiments, an energy storage device 24 may include electrical charge storage devices such as batteries, optionally augmented with capacitors.

In certain embodiments, a RES-ESS dispatcher unit 36 has the ability to control the charge or discharge of the energy storage device 24 (e.g., batteries) by communicating with an ESS controller 22. The ESS controller may be located in the RES-ESS facility 11. A RES SCADA (supervisory control and data acquisition) controller 12 may be operatively coupled with RES inverters 16 associated with the renewable electrical energy generation device 14 (optionally embodied in a PV array), and the ESS controller 22 may be operatively coupled with ESS inverters 26 associated with the energy storage device 24. Both the RES SCADA controller 12 and the ESS controller 22 may be in communication with the RES-ESS dispatcher unit 36. In certain embodiments, a utility control center 38 (e.g., of an electric power utility or grid operator) may communicate with the RES-ESS dispatcher unit 36 using DNP3 and set different configuration options. Additionally, the RES-ESS dispatcher unit 36 may receive or generate an accurate renewable generation forecast (e.g., solar generation forecast). The RES-ESS dispatcher unit 36 may use the forecast to implement the CCD and other control modes.

As shown in FIG. 1A, certain embodiments may utilize readily available electric power meters, such as a RES+ESS electrical power meter 32 to measure RES-ESS (e.g., PV+S) facility output, a RES electrical power meter 19 to measure RES output, and an ESS electrical power meter 29 to measure ESS output. Signals from the RES electrical power meter 19 are provided to the RES SCADA controller 12, and signals from the ESS electrical power meter 29 are provided to the ESS controller 22. The electric power generated by the RES-ESS facility 11 may be provided to an electric power system (e.g., an AC electrical grid 34) via a generator step-up (GSU) substation 30 that implements protection and appropriate voltage conversion. RES transformers 18 and ESS transformers 28 may be arranged between the inverters 16, 26, respectively, and the GSU substation 30 to provide voltage conversion utility (e.g., to supply AC power signals to the GSU substation 30 at 34.5 kV in certain implementations).

Figure 1B:
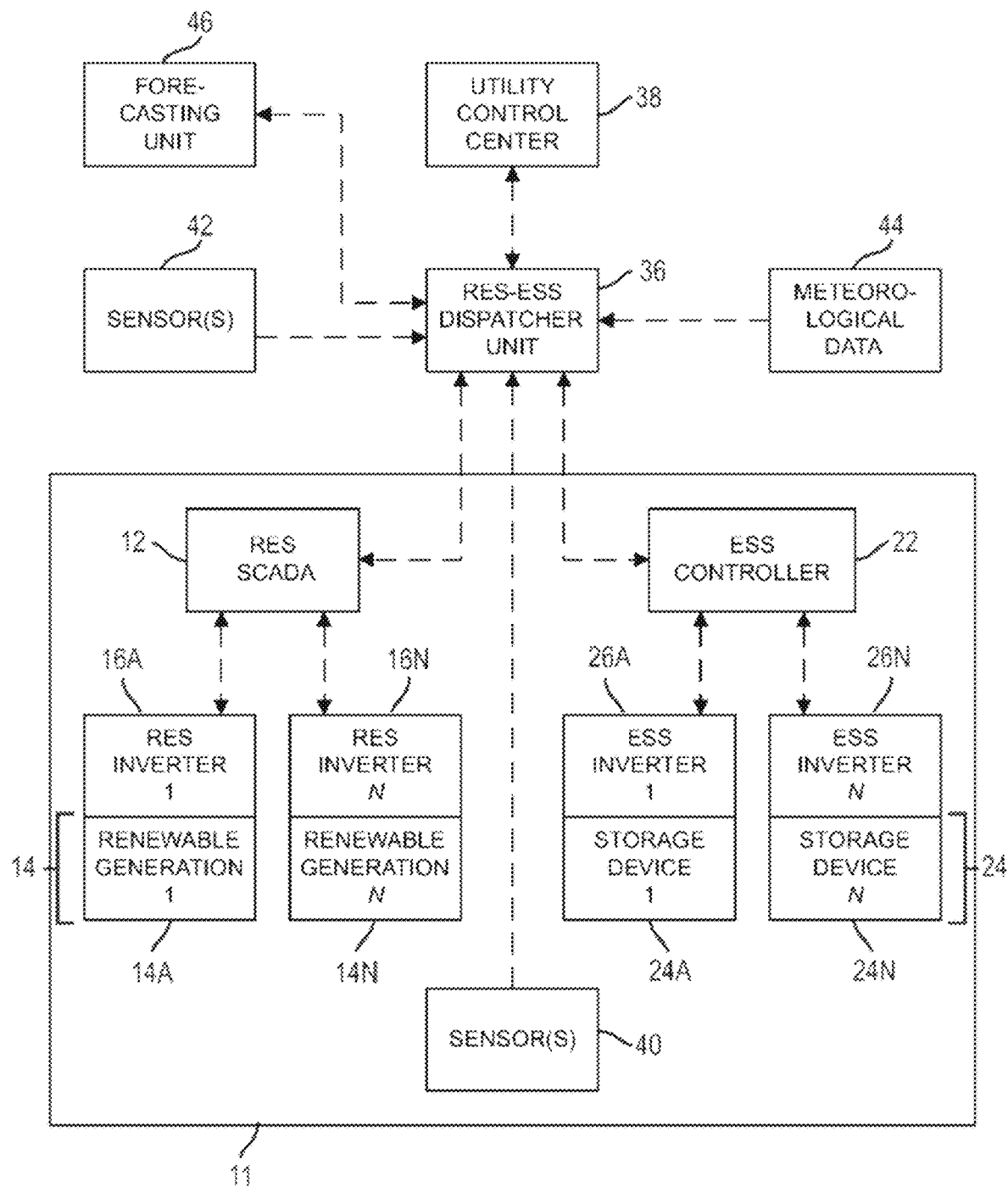
FIG. 1B is a schematic diagram showing certain components of the metering and control system of FIG. 1A, according to some embodiments.

Referring now to FIG. 1B, a schematic diagram showing certain components of the AC coupled metering and control system of FIG. 1A, including interconnection of control- and sensor-related components is shown, according to one embodiment. As shown in FIG. 1B, the RES-ESS dispatcher unit 36 may be arranged between a utility control center 38 and a RES-ESS facility 11. Within the RES-ESS facility 11, a RES SCADA controller 12 may be operatively coupled with RES inverters 16A-16N (wherein N represents any suitable number) that are configured to provide AC conversion of DC power produced by renewable electrical energy generation units 14A-14N (e.g., arrangeable as parts of a renewable electrical energy generation device 14). Similarly, within the RES-ESS facility 11, an ESS controller 22 may be operatively coupled with ESS inverters 26A-26N that are configured to provide AC conversion of DC power supplied by energy storage units 24A-24N (e.g., arrangeable as parts of an energy storage device 24). The RES-ESS facility 11 further includes at least one sensor 40, which may comprise one or more sky imaging sensors useful to determine sky conditions (such as the presence of clouds or lack thereof) proximate to the RES-ESS facility 11, with output signals from the at least one sensor 40 being supplied to the RES-ESS dispatcher unit 36. The RES-ESS dispatcher unit 36 may also receive: (i) signals from one or more sensors 42 (e.g., satellite imaging sensors or the like) not necessarily associated with the RES-ESS facility 11; (ii) meteorological data provided by a meteorological modeling unit 44; (iii) signals from a forecasting unit 46 that may forecast generation by the renewable electrical energy generation device 14 and/or one or more other renewable electrical energy generation devices or units. In certain embodiments, time-dependent forecasting of electrical energy production may be performed by the forecasting unit 46 or may be performed by the RES-ESS dispatcher unit 36. In certain embodiments, a time-dependent forecast of electrical energy production may utilize one, two, or all three of the following: on-site sky imaging provided by the sensor(s) 40, satellite imaging provided by the sensor(s) 42, and meteorological data provided by the meteorological modeling unit 44. In certain embodiments, sensors of other types may be used.

Figure 2:
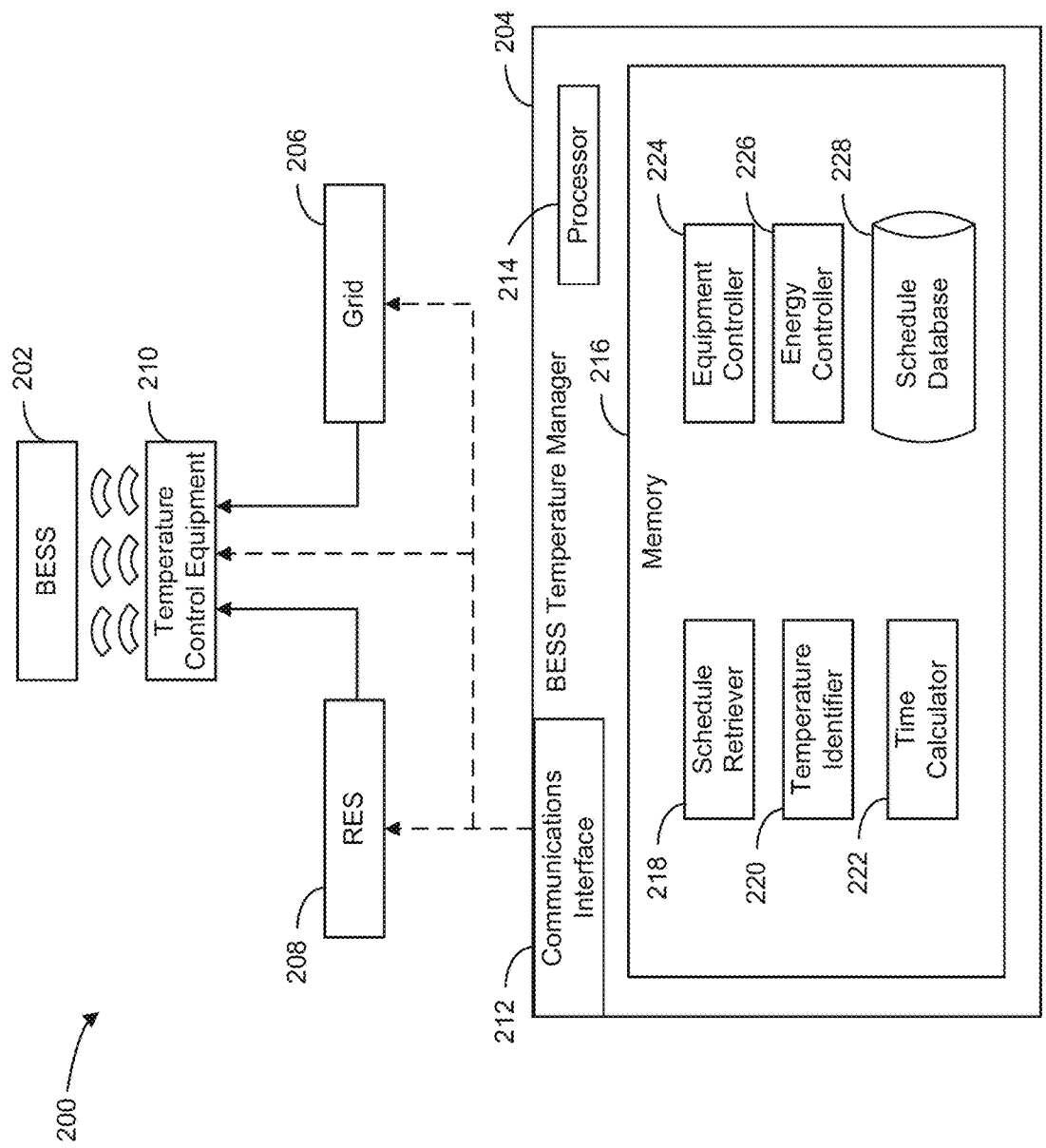
FIG. 2 illustrates a block diagram of an example system for controlling the temperature of a battery energy storage system (BESS) temperature, according to some embodiments.

Referring now to FIG. 2, a system 200 for controlling the temperature of a BESS 202 is shown, in accordance with some embodiments of the present disclosure. In brief overview, the system 200 can include a BESS temperature manager 204 that communicates with an energy grid 206 (e.g., a utility grid operator controlling the energy grid 206), an RES 208 (e.g., one or more solar panels or other types of renewable energy sources), and/or temperature control equipment 210 over a network. These components may operate together to control the temperature of the BESS 202 over time as the BESS 202 charges and/or discharges. For example, the BESS 202 may charge or discharge according to a charge/discharge schedule. During charging or discharging, the temperature of the BESS 202 may increase. The BESS temperature manager 204 may control the energy grid 206 and/or the RES 208 to direct energy to the temperature control equipment 210 to control the temperature of the BESS 202 (e.g., heat or cool the BESS 202) to avoid harmful operating conditions. The system 200 may include more, fewer, or different components than shown in FIG. 2. For example, there may be any number of client devices or computers that make up or are a part of the BESS temperature manager 204 or networks in the system 200. Further in some embodiments, the BESS temperature manager 204 may control the charging and discharging of the BESS 202.

The BESS temperature manager 204 can include or execute on one or more processors or computing devices and/or communicate via a network. The network can include computer networks such as the Internet, local, wide, metro, or other area networks, intranets, satellite networks, and other communication networks such as voice or data mobile telephone networks. The network can be used to access information resources such as web pages, websites, domain names, or uniform resource locators that can be presented, output, rendered, or displayed on at least one computing device, such as a laptop, desktop, tablet, personal digital assistant, smartphone, portable computers, or speaker.

The BESS temperature manager 204 can include or utilize at least one processing unit or other logic device such as a programmable logic array engine or a module configured to communicate with one another or other resources or databases. The components of the BESS temperature manager 204 can be separate components or a single component. The system 200 and its components can include hardware elements, such as one or more processors, logic devices, or circuits.

The BESS temperature manager 204 may comprise one or more processors that are configured to control the temperature control equipment 210 (e.g., HVAC equipment) to cool the BESS 202 such that the BESS 202 remains within an acceptable temperature range. The BESS temperature manager 204 may comprise a communications interface 212, a processor 214, and/or memory 216. The BESS temperature manager 204 may communicate with the RES 208 (or devices controlling the RES 208) via the communications interface 212. The processor 214 may be or include an ASIC, one or more FPGAs, a DSP, circuits containing one or more processing components, circuitry for supporting a microprocessor, a group of processing components, or other suitable electronic processing components. In some embodiments, the processor 214 may execute computer code or modules (e.g., executable code, object code, source code, script code, machine code, etc.) stored in the memory 216 to facilitate the activities described herein. The memory 216 may be any volatile or non-volatile computer-readable storage medium capable of storing data or computer code.

The memory 216 may include a schedule retriever 218, a temperature identifier 220, a time calculator 222, an equipment controller 224, an energy controller 226, and a schedule database 228. In brief overview, the components 218-228 may cooperate to control the temperature of the BESS 202 to remain within an acceptable range. The components 218-228 may identify a time period in which the BESS 202 is scheduled to be charged or discharged, in some cases from a charge/discharge schedule. The components 218-228 may calculate a temperature control time period for the temperature control equipment 210 to operate to cool or control the temperature of the BESS 202 to reach a target temperature that enables the BESS 202 to heat up during the charge or discharge period without exceeding a defined maximum temperature. The components 218-228 may then operate the temperature control equipment 210 to control the temperature of the BESS 202 for the temperature control time period. In this way, the components 218-228 may ensure the BESS 202 remains within a range of temperatures in which the BESS 202 does not become damaged or leak an excessive amount of energy while avoiding operating the temperature control equipment 210 during the charging or discharging period.

The schedule retriever 218 may comprise programmable instructions that, upon execution, cause processor 214 to retrieve a charge/discharge schedule for the BESS 202 from the schedule database 228. For example, the schedule retriever 218 may retrieve a charge/discharge schedule from the schedule database 228 for the following day. The charge/discharge schedule may be a data file including a schedule for a defined time period (e.g., an hour, a day, a week, a month, etc.) indicating one or more charge or discharge time periods (e.g., smaller time periods or time frames having beginning times and end times within the time period of the schedule) to charge or discharge the BESS 202. The schedule retriever 218 may retrieve the charge/discharge schedule from the schedule database 228 (e.g., a relational database) based on the time period of the charge/discharge schedule. For example, the schedule database 228 may store multiple charge/discharge schedules for future time periods. Each charge/discharge schedule may include time stamps indicating the beginning and/or the end of the time period of the respective charge/discharge schedule. The schedule retriever 218 may identify the beginning time (and/or date) of each schedule and retrieve the schedule with a beginning time closest to the current time. In some embodiments, the charge/discharge schedules may be sequentially numbered and the schedule retriever 218 may identify and retrieve the charge/discharge schedule with the lowest (or highest depending on the configuration) sequential value in the schedule database 228, in some cases subsequent to a previously retrieved schedule.

The temperature identifier 220 may comprise programmable instructions that, upon execution, cause processor 214 to identify a target temperature for the BESS 202 to have upon initiating charging or discharging for a charge or discharge time period. The temperature identifier 220 may identify the charge or discharge time period by identifying the next charge or discharge time period on the charge/discharge schedule. The temperature identifier 220 may do so by analyzing (e.g., use natural language processing techniques or other processing techniques, such as identifying rows or columns in a data file including the charge/discharge schedule) the charge or discharge time periods identified in the charge/discharge schedule. The temperature identifier 220 may identify the next charge or discharge time period based on the charge or discharge time period being the next such time period on the schedule. For example, the temperature identifier 220 may identify the charge or discharge time period responsive to the charge or discharge time period having a beginning time that is closest to the current time or based on the charge or discharge time period being the next time period in a sequential list on the schedule (e.g., the next row or column on the charge/discharge schedule).

In some instances, the temperature identifier 220 may identify a charge or discharge time period that is subsequent to a previous future charge or discharge time period. The temperature identifier 220 may do so, for example, in instances in which the BESS temperature manager 204 uses batch processing techniques at set time intervals to calculate different control parameters of the power plant for a future time period. In such instances, the temperature identifier 220 may identify the charge or discharge time period subsequent to a previously identified time or discharge time period in the charge/discharge schedule.

The temperature identifier 220 determines whether to calculate a time period to operate temperature control equipment 210 based on the temperature of the BESS 202 at the current time or based on a predicted BESS temperature in the future. The temperature identifier 220 may make this determination according to a set of rules. For example, the temperature identifier 220 may determine to calculate the time period to operate the temperature control equipment 210 for the BESS 202 based on the current time if the temperature identifier 220 is calculating the time period to operate temperature control equipment 210 in preparation for the next charge or discharge time period of the charge/discharge schedule. In another example, the temperature identifier 220 may determine to calculate the time period to operate the temperature control equipment 210 for the BESS 202 based on a predicted temperature if the charge or discharge time period is subsequent to another future charge or discharge time period. In yet another example, the temperature identifier 220 may determine to calculate the time period to operate the temperature control equipment 210 for the BESS 202 based on a predicted temperature if the charge or discharge time is a time in the future above a threshold (e.g., is too far into the future). By applying the set of rules, the temperature identifier 220 may account for potential changes in temperature of the BESS 202 based on the environment or intermittent charge or discharge time periods (e.g., future charge or discharge time periods prior to the charge or discharge time period for which the temperature 220 is identifying temperatures). The temperature identifier 220 may use measured temperatures of the BESS 202 for calculations in which the environment or other charge or discharge time periods may have little to no impact. The temperature identifier 220 may use predicted temperatures when such factors may have an impact. Thus, the BESS temperature manager 204 may more accurately calculate the time period to operate the temperature control equipment 210 taking different situations into account.

If the temperature identifier 220 determines to calculate the temperature control time period based on the current temperature, the temperature identifier 220 may identify the current temperature of the BESS 202. The temperature identifier 220 may identify the current temperature of the BESS 202 by retrieving or collecting temperature data from sensors that measure the temperature of the BESS 202. The temperature identifier 220 may receive or retrieve temperature data for the current temperature of the BESS 202 from the sensors and identify the current temperature either directly from the temperature data or by calculating an average temperature from the temperature data.

If the temperature identifier 220 determines to calculate the temperature control time period based on a predicted temperature, the temperature identifier 220 may predict the temperature of the BESS 202. In some embodiments, the temperature identifier 220 may predict the temperature for the BESS 202 for a defined time prior to the beginning time of the identified charge or discharge time period. For example, the temperature identifier 220 may be configured to predict the temperature for two hours prior to the charge or discharge time period. The temperature identifier 220 may identify the beginning time of the charge or discharge time period and identify the time two hours prior to the beginning time. In some embodiments, the temperature identifier 220 may be configured to predict the temperature at an identified time between the identified charge or discharge time period and an immediately previous charge or discharge time period. For example, the temperature identifier 220 may identify the beginning time of the identified charge or discharge time period and the end time of the immediately previous charge or discharge time period. The temperature identifier 220 may identify the defined time as a defined time percentage between the two times (e.g., midway between, 25% between, 75% between, etc.). By identifying the time in this manner, the temperature identifier 220 may factor in external factors such as the environment and/or other charging or discharging time periods when predicting the future temperature of the BESS 202.

After identifying the time for which to predict the temperature, the temperature identifier 220 may predict the temperature for the identified time. The temperature identifier 220 may do so, for example, by factoring any charge or discharge time periods between the current time and the identified future time and/or environmental factors. If there are not any charge or discharge time periods for the BESS 202 between the current time and the identified future time, the temperature identifier 220 may predict the temperature of the BESS 202 based only on an external weather forecast (e.g., a forecast provided by a weather service). The temperature identifier 220 may do so by executing a thermal model (e.g., a machine learning model or an analytical model) that factors in environmental temperature and/or the current temperature of the BESS 202 to predict a change in temperature (e.g., a heat transfer of the BESS 202) between the current time and the predicted time in the future. For instance, the temperature identifier 220 may execute the thermal model according to the following heat transfer algorithm:

$$T(t+\Delta t)=T(t)-Q(t)\times \Delta t/M$$

where $T(t)$ is the temperature at time t, $\Delta t$ is a time interval, $Q(t)$ is the heat outflow rate at time t, and M is the thermal mass of the BESS 202; and $$Q(t)=(T(t)-T_2(t))/R$$

where $T_2(t)$ is the temperature on the other side of R at time t, and R is a heat transfer thermal resistance value. The temperature identifier 220 may predict the temperature of the BESS 202 at the identified time as the output of the thermal model. More information detailing how the temperature identifier 220 can execute the thermal model to predict the future temperature and changes in temperature during charging and discharging is described in U.S. patent application Ser. No. 17/717,983, filed Apr. 11, 2022, the entirety of which is incorporated by reference herein.

In cases in which there are one or more charging and/or discharging time periods between the current time and the identified time, the temperature identifier 220 may predict the temperature of the BESS 202 based on the charge and/or discharge time periods and/or an external weather forecast. For example, in some instances, the temperature identifier 220 may have previously calculated the temperature of the BESS 202 at the end time of the charge or discharge time period for each of the intermittent charge or discharge time periods using the systems and methods described herein. In such instances, the temperature identifier 220 may identify the predicted temperature of the BESS 202 at the end of the charging or discharging time period immediately prior to the identified time. The temperature identifier 220 may then execute the thermal model using the forecast environmental temperature of the time between the end time and the identified time and the temperature at the end time to predict the temperature of the BESS 202 at the identified time.

In other instances, the BESS temperature manager 204 may not have previously calculated the temperature changes or temperatures of the intermittent charge or discharge time periods. In such instances, the temperature identifier 220 may execute the thermal model for the time between the current time and the predicted time and input data that corresponds to the environmental factors (e.g., data collected from a weather service) and BESS operating factors, such as heat that is added and/or removed from the BESS 202 during charging or discharging time periods. The temperature identifier 220 may execute the model using data from the time period to predict the temperature for the identified time.

The temperature identifier 220 may calculate the BESS temperature increase for the charge or discharge time period. The temperature identifier 220 may calculate the BESS temperature increase for the charge or discharge time period by executing the thermal model described above using data for the charge or discharge time period. For example, the temperature identifier 220 may calculate the length or duration of the charge or discharge time period by subtracting the beginning time of the charge or discharge time period from the end time of the charge or discharge time period. The temperature identifier 220 may also retrieve forecast external weather data, such as the forecast temperature, for the charge or discharge time period. The temperature identifier 220 may input the length of the charge or discharge time period, the forecast external weather data, and an indication of whether the BESS 202 will be charging or discharging into the thermal model. In some embodiments, the temperature identifier 220 may input other data, such as a charge or discharge rate or an amount of energy discharged during the time period. The temperature identifier 220 may execute the thermal model with the input data to calculate the BESS temperature increase for the charge or discharge time period.

In another example, the temperature identifier 220 may calculate the temperature increase of the charge or discharge time period using a set of rules. For example, the temperature identifier 220 may store indications of average temperature increases over time (e.g., a temperature change rate) during charging and discharging of the BESS 202. The temperature identifier 220 may identify whether the charge or discharge period is a charging period or a discharging period from the charge/discharge schedule and identify the temperature increase associated with charging or discharging. The temperature identifier 220 may then identify the length or duration of the charge or discharge time period and calculate the temperature increase according to the average temperature increase over time and the length or duration of the charge or discharge period. In some embodiments, the temperature identifier 220 may modify the average temperature increase based on a stored factor depending on the amount of energy being charged or discharged (e.g., the temperature of the BESS 202 may increase more over time when the BESS 202 is charging or discharging more energy faster) or charging or discharging more power for the time period. Accordingly, the temperature identifier 220 may use a rules-based approach to accurately determine a predicted change in temperature during the charge or discharge period.

The temperature identifier 220 may calculate a target temperature of the BESS 202. The target temperature may be a temperature that the BESS 202 may be at the beginning of the charge or discharge time period such that the temperature of the BESS 202 does not increase above a stored maximum temperature and/or remaining inside of a stored acceptable range while charging or discharging during the charge or discharge time period. For example, the temperature identifier 220 may retrieve the maximum temperature, the highest temperature of an acceptable range, or a defined percentage (e.g., 80%) of the maximum temperature for the BESS 202 from memory. The temperature identifier 220 may then subtract the calculated temperature increase from the maximum temperature, the highest temperature of the acceptable range, or the defined percentage to obtain the target temperature. The temperature identifier 220 may use the retrieved temperature to determine what temperature the BESS 202 should be at the beginning of the charge or discharge time period to avoid overheating the BESS 202 while charging or discharging. The temperature identifier 220 may thus avoid causing energy loss or damage to the BESS 202 during charging or discharging without concurrently operating temperature control equipment 210.

The time calculator 222 may comprise programmable instructions that, upon execution, cause processor 214 to identify the beginning and/or duration of a temperature control time period in which to operate temperature control equipment 210. The time calculator 222 may calculate a beginning time of a temperature control time period. The temperature control time period may be a time period in which the time calculator 222 controls equipment 210 to control the temperature of the BESS 202. For example, the time calculator 222 may change the state of fans and/or a chiller to blow cool air on the BESS 202 to cool the BESS 202. The time calculator 222 may change the state of such equipment 210 from "off" to "on" at the beginning of the temperature control time period and from "on" to "off" at the end of the time period to control the temperature (e.g., cool) of the BESS 202 for the temperature control time period.

The time calculator 222 may calculate the beginning time of the temperature control time period based on the target temperature. To do so, the time calculator 222 may calculate a difference between the current or predicted temperature of the BESS 202 and the target temperature. The time calculator 222 may then retrieve an average temperature change of the BESS 202 when the temperature control equipment 210 is in the "on" state. The time calculator 222 may divide the calculated temperature difference by the average temperature change of the BESS 202 when the temperature control equipment 210 is in the "on" state to calculate a length or duration of the temperature control time period. The time calculator 222 may then subtract the calculated length or duration from the beginning time of the charge or discharge time period to calculate the beginning time of the temperature control time period. The time calculator 222 may store the beginning time in memory with an association with the charge or discharge time period (e.g., the beginning time may be a tag or be in the same line or column as a string identifying the charge or discharge time period in memory).

The equipment controller 224 may comprise programmable instructions that, upon execution, cause processor 214 to transmit control signals or otherwise control the temperature control the equipment 210 to cool or heat the BESS 202. The equipment controller 224 may adjust the state of the temperature control equipment 210 at the calculated beginning time of the temperature control time period. For example, the equipment controller 224 or the BESS temperature manager 204 may maintain an internal clock or calendar. The equipment controller 224 may compare the stored beginning time of the temperature control time period to the internal clock or calendar over time. When the internal clock or calendar match the stored beginning time, the equipment controller 224 may adjust the state of the equipment 210. In this way, the stored beginning time may operate as an interrupt that causes the equipment controller 224 to control the equipment 210.

The energy controller 226 may comprise programmable instructions that, upon execution, cause processor 214 to transmit control signals or otherwise control the direction of energy to and/or from the energy grid 206 and/or the RES 208 temperature control equipment 210 to cool or heat the BESS 202. The energy controller 226 may measure the new energy requirements for the equipment 210. The energy controller 226 may measure the new energy requirements by measuring a change in a value of a meter connected to the equipment 210 (e.g., a BESS meter between the equipment 210 and one or both of the energy grid 206 and the RES 208). The energy controller 226 may adjust the equipment 210 to the "on" state and the equipment controller 224 may identify the change in the energy requirements of the equipment 210 as the change in value of the meter. In this way, the energy controller 226 may measure the new energy requirements of the equipment 210 in the "on" state.

The energy controller 226 may determine if there is any available clipped energy to use to power the temperature control equipment 210. The energy controller 226 may do so by identifying the settings of a controller (e.g., the BESS temperature manager 204) that is controlling the RES 208, such as one or more solar panels. The settings may indicate a maximum amount of energy the RES 208 can provide to the energy grid 206 or a load. The energy controller 226 may identify the maximum amount of energy the settings indicate can be generated and the amount of energy the RES 208 is capable of generating (e.g., can generate for the charge or discharge time period based on a forecast of predicted energy production). The energy controller 226 may determine there is available clipped energy by comparing the settings limit to the amount of energy the RES 208 is capable of generating. If the settings limit is lower than the amount of power the RES 208 can generate, the energy controller 226 may determine there is clipped energy available to power the temperature control equipment 210. Otherwise, the energy controller 226 may determine there is not clipped energy available. In some embodiments, the energy controller 226 determines whether to use clipped energy to power the temperature control equipment 210 by identifying settings in memory.

If the energy controller 226 determines there is not clipped energy available to be used and/or identifies a setting to use energy other than clipped energy to power the temperature control equipment 210, the energy controller 226 may direct available energy to the temperature control equipment 210. In doing so, the energy controller 226 may direct any of the currently available energy generated by the RES, energy from an energy grid, or the BESS 202 itself to power the temperature control equipment 210. The energy controller 226 may direct the measured amount of the new energy requirements to enable the temperature control equipment 210 to remain in the "on" state to control the temperature of the BESS 202 for the temperature control time period.

If the equipment controller 224 determines there is clipped energy available to be used and/or identifies a setting to use clipped energy to power the temperature control equipment 210 the energy controller 226 may determine if the RES 208 is directing energy to the energy grid 206. In some embodiments, the energy controller 226 may make this determination by identifying a setting in memory that indicates whether to take into account power or energy losses that result from energy traveling over a long line between the meter and a meter coupled to a power grid. In some embodiments, the energy controller 226 may identify a charging schedule from memory and determine if the RES 208 is scheduled to deliver power to the grid at the time for which the RES 208 is powering temperature control equipment 210 for the temperature control time period. In some embodiments, the energy controller 226 may determine if the RES 208 is directing energy to the grid by determining the RES 208 is connected to a photovoltaic (PV) meter coupled to a meter at an energy grid (e.g., determine if there is a value in memory that indicates the presence of such a PV meter).

If the energy controller 226 determines the RES 208 is providing energy to the energy grid, the energy controller 226 adjusts a setting limiting the clipped energy from the RES 208 based only on the new energy requirements. The energy controller 226 may do so, for example, by aggregating the new energy requirements to the current energy limit of the RES. The energy controller 226 may aggregate the two values together (in some cases with an added tolerance) and set the new energy limit for the RES 208 to the aggregated value. The energy controller 226 may direct the difference between the aggregated value and the previous energy limit for the RES 208 to the equipment 210.

If the energy controller 226 determines the RES 208 is providing energy to the energy grid, the energy controller 226 identifies the energy loss between a meter (e.g., a PV meter) directly coupled to the RES 208 and measuring incoming and outgoing energy from the RES 208 and a meter (e.g., a grid meter) connected to and measuring incoming and outgoing energy from the energy grid. The energy loss may result from the natural loss of energy as energy travels a long distance on a power line between the RES 208 and the energy grid 206. The energy controller 226 may identify the energy loss from memory.

The energy controller 226 may set the maximum energy output of the RES 208 based on the energy loss and the new energy requirements. The energy controller 226 may set the maximum energy output by aggregating the new energy requirements and the current energy limit that the energy controller 226 may have previously calculated to account for the energy loss on the power line and setting the maximum energy output to the aggregated value, in some cases with a buffer. In some embodiments, the energy controller 226 may aggregate the energy loss, the new energy requirements, previous energy requirements (e.g., energy the RES 208 was scheduled to provide to the energy grid or to equipment 210 within the energy plant), and, in some cases, a defined buffer, to determine the aggregated value. The energy controller 226 may direct the difference between the aggregated value and the previous energy limit for the RES 208 to the equipment 210.

In some instances, the RES 208 may not generate enough previously clipped energy to power the equipment 210 to cool the BESS 202. For example, the energy controller 226 may determine the amount of previously clipped energy may not be enough to control the temperature of the BESS 202 to reach the target temperature. In this case, the energy controller 226 may calculate a difference between the amount of previously clipped energy and the measured energy the equipment 210 requires. The energy controller 226 may retrieve or direct the calculated difference in energy from the RES, the energy grid, or the BESS 202 (in that order depending on energy availability) to the equipment 210 to sufficiently power the equipment 210 to operate for the energy temperature control time period.

Figure 3:
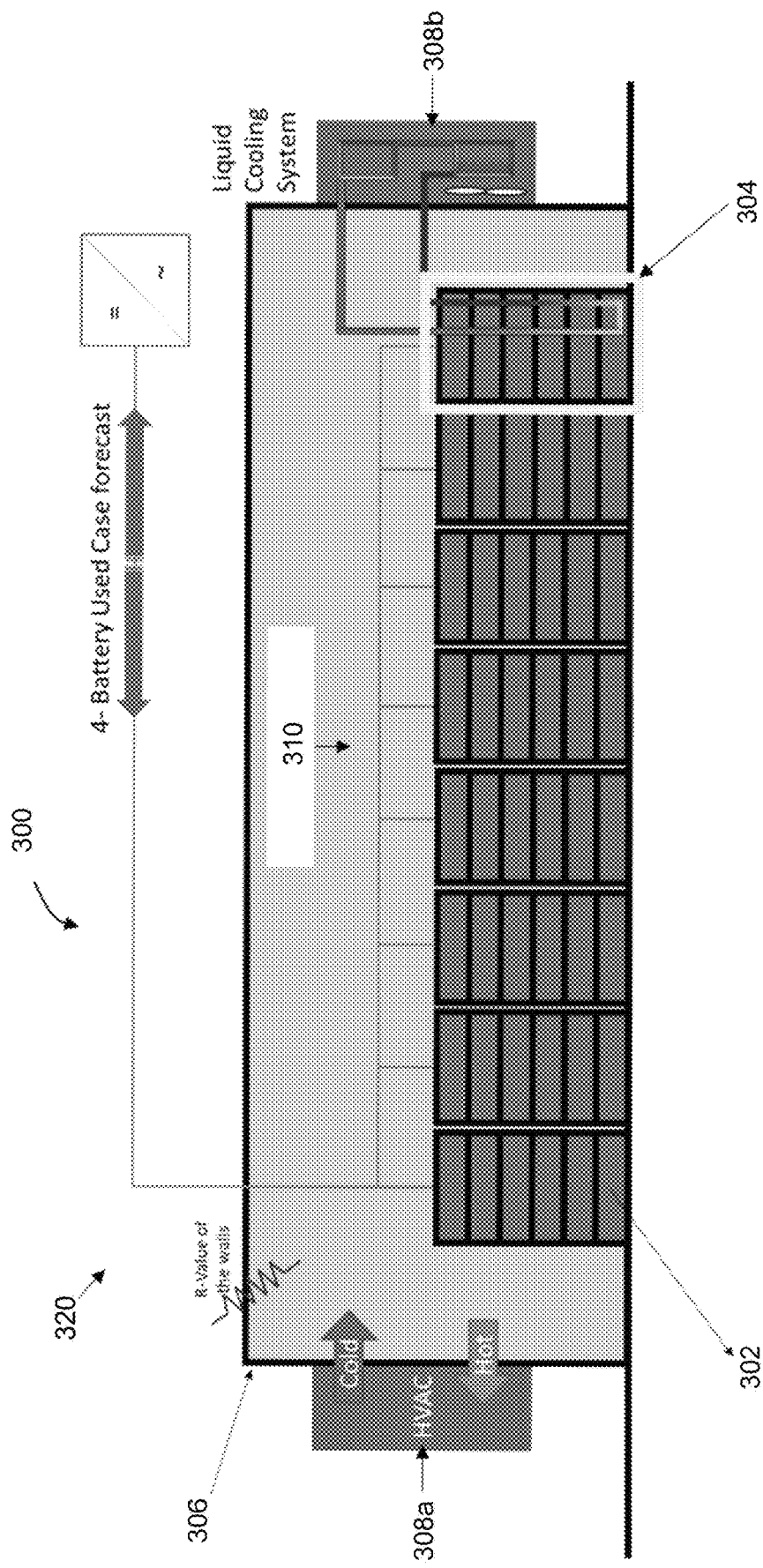
FIG. 3 illustrates a BESS temperature control system, according to some embodiments.

Referring now to FIG. 3, a system for controlling the temperature of a BESS 300 during charging and discharging is shown, in accordance with some embodiments of the present disclosure. The BESS 300 of FIG. 3 may comprise battery cells 302, a battery enclosure 306, cooling systems 308a and 308b, internal ambient air 310, and an external environment 320. Using the cooling system 308a, heat may be transferred between the battery cells 302 and the internal ambient air 310 inside the battery enclosure 306, and then between the internal ambient air 310 and the external environment 320 through the heating, ventilation and air conditioning ("HVAC") system. The cooling system 308a may include several mechanisms for heat transfer, including passive vanes and fans associated with battery modules or racks, as well as enclosure-level fans and active air conditioning systems which may be operated with some or all of their compressor units operating.

Using the cooling system 308b, heat may be transferred between the battery cells 302 and a liquid coolant, and then between the liquid coolant and the external environment 320. Liquid cooling systems such as the cooling system 308b may also be operated with some or all of their compressor units operating and may circulate the liquid using higher or lower flow rates. An area 304 shown in FIG. 3 illustrates a localized battery cell location within the BESS 300 where localized cooling can occur, as described above.

Figure 4:
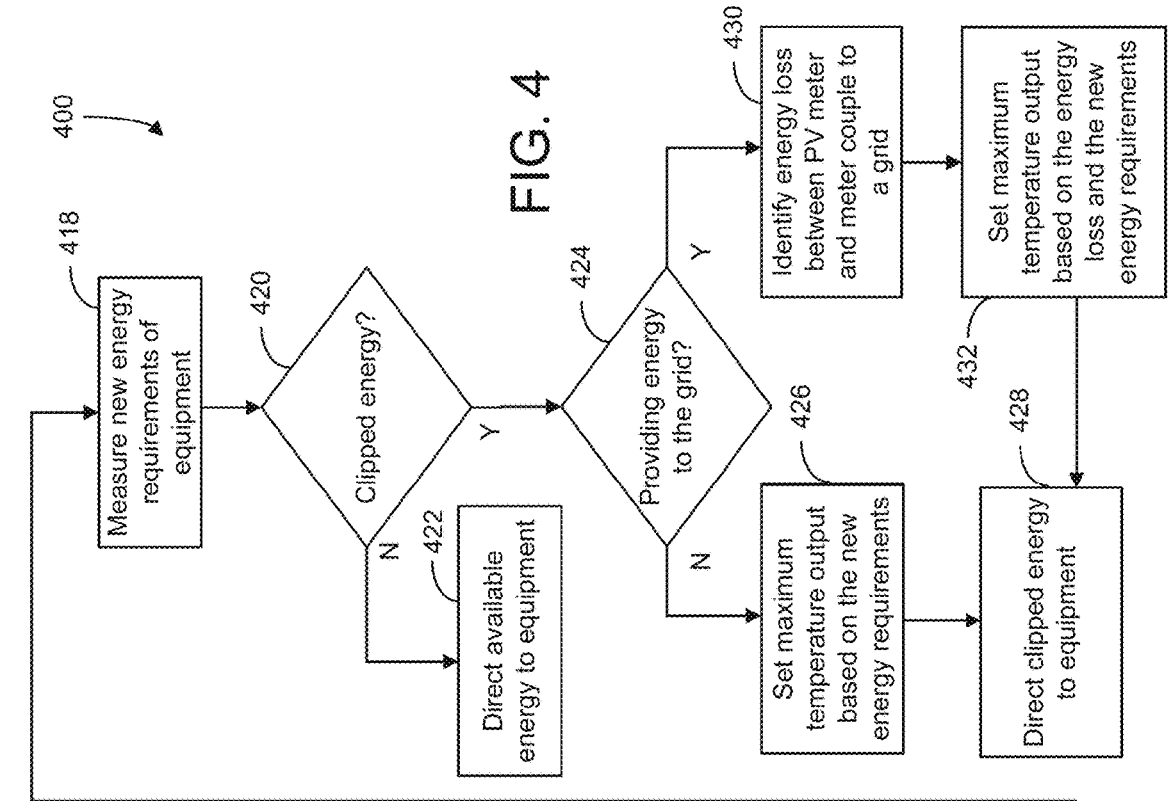
FIG. 4 illustrates a flowchart of an example method for controlling the temperature of a BESS, according to some embodiments.
Figure 4:
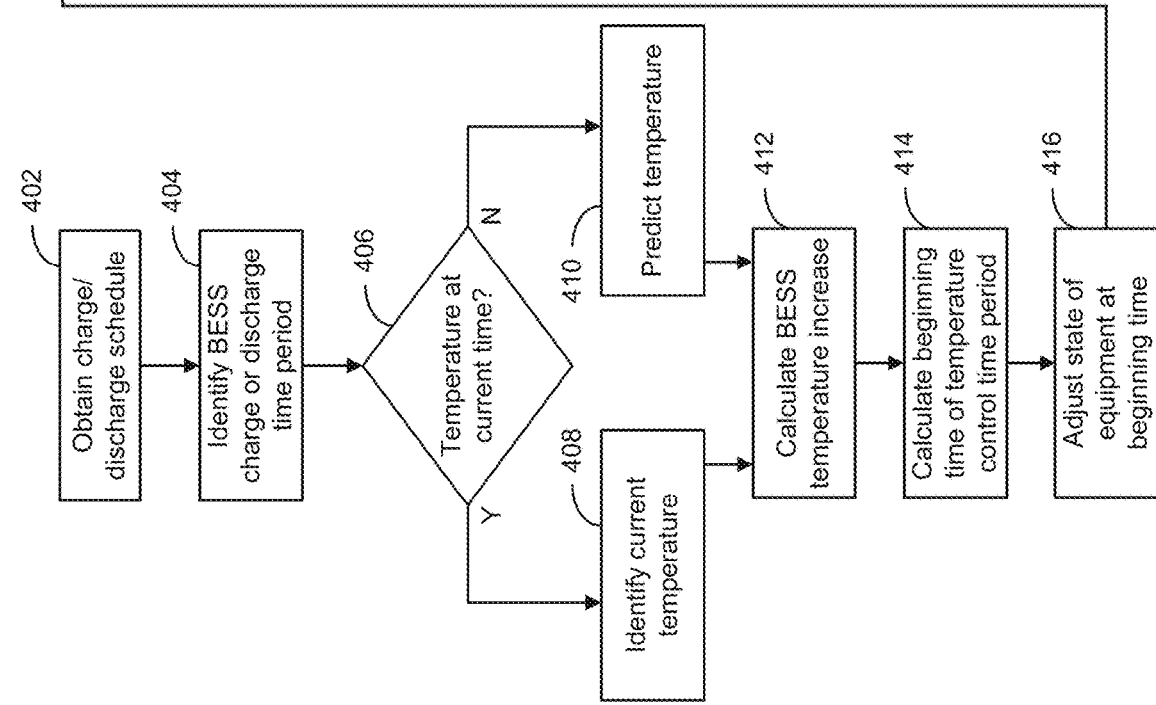

FIG. 4 illustrates a method 400 for managing a temperature of a BESS, according to some embodiments. The method 400 can be performed by a data processing system (e.g., a controller, the RES-ESS dispatcher unit 36, the ESS controller 22, the RES SCADA controller 12, the computer 600, the BESS temperature manager 204, etc.). In some embodiments, the data processing system is the controller of a renewable energy plant that contains one or more renewable energy sources that charge a BESS of the renewable energy plant. The data processing system may control equipment that operates to control the temperature of the BESS of the renewable energy plant in preparation for the BESS to charge and/or discharge energy (e.g., charge energy by storing energy received from a renewable energy source and discharge energy to a consumer load or a utility grid). The method 400 may include more or fewer operations and the operations may be performed in any order. Performance of method 400 may enable the data processing system to operate equipment that controls the temperature of a battery based on a charge/discharge schedule of the battery. The data processing system may do so in such a way as to ensure the temperature of the BESS follows established criteria while minimizing the amount of energy that is required to do so.

At operation 402, the data processing system obtains a charge/discharge schedule. The data processing system may obtain the charge/discharge schedule by receiving the charge/discharge schedule from a computing device across a network or by retrieving the charge/discharge schedule from a database stored in memory. The data processing system may retrieve the charge/discharge schedule from the database based on the time period of the charge/discharge schedule. For example, the database may store multiple charge/discharge schedules for future time periods. Each charge/discharge schedule may include time stamps indicating the beginning and/or the end of the time period of the respective charge/discharge schedule. The data processing system may identify the beginning time (and/or date) of each schedule and retrieve the schedule with a beginning time closest to the current time. In some embodiments, the charge/discharge schedules may be sequentially numbered and the data processing system may identify and retrieve the charge/discharge schedule with the lowest (or highest depending on the configuration) sequential value in the database, in some cases subsequent to a previously retrieved schedule.

At operation 404, the data processing system identifies a charge or discharge time period. The data processing system may identify the charge or discharge time period by identifying the next charge or discharge time period on the charge/discharge schedule. The data processing system may analyze the charge or discharge time periods identified in the charge/discharge schedule. The data processing system may identify the next charge or discharge time period based on the charge or discharge time period being the next such time period on the schedule. For example, the data processing system may identify the charge or discharge time period responsive to the charge or discharge time period having a beginning time that is closest to the current time or based on the charge or discharge time period being the next time period in a sequential list on the schedule (e.g., the next row or column on the charge/discharge schedule).

In some instances, the data processing system may identify a charge or discharge time period that is subsequent to a previous future charge or discharge time period. The data processing system may do so, for example, in instances in which the data processing system uses batch processing techniques at set time intervals to calculate different control parameters of the power plant for a future time period. In such instances, the data processing system may identify the charge or discharge time period subsequent to a previously identified time or discharge time period in the charge/discharge schedule.

At operation 406, the data processing system determines whether to calculate a time period to operate temperature control equipment based on the temperature of the BESS at the current time or based on a predicted BESS temperature in the future. The data processing system may make this determination according to a set of rules. For example, the data processing system may determine to calculate the time period to operate the temperature control equipment for the BESS based on the current time if the data processing system is calculating the time period to operate temperature control equipment in preparation for the next charge or discharge time period of the charge/discharge schedule. In another example, the data processing system may determine to calculate the time period to operate the temperature control equipment for the BESS based on a predicted temperature if the charge or discharge time period is subsequent to another future charge or discharge time period. In yet another example, the data processing system may determine to calculate the time period to operate the temperature control equipment for the BESS based on a predicted temperature if the charge or discharge time is a time in the future above a threshold. By applying the set of rules, the data processing system may account for potential changes in temperature of the BESS based on the environment or intermittent charge or discharge time periods. The data processing system may use measured temperatures of the BESS for calculations in which the environment or other charge or discharge time periods may have little to no impact and predicted temperatures when such factors may have an impact. Thus, the data processing system may more accurately calculate the time period to operate the temperature control equipment taking different situations into account.

If the data processing system determines to calculate the temperature control time period based on the current temperature, at operation 408, the data processing system identifies the current temperature of the BESS. The data processing system may identify the current temperature of the BESS by retrieving or collecting temperature data from sensors that measure the temperature of the BESS. The data processing system may receive or retrieve temperature data for the current temperature of the BESS from the sensors and identify the current temperature either directly from the temperature data or by calculating an average of the temperature data.

If the data processing system determines to calculate the temperature control time period based on a predicted temperature, at operation 410, the data processing system predicts the temperature of the BESS. In some embodiments, the data processing system may predict the temperature for the BESS for a defined time prior to the beginning time of the identified charge or discharge time period. For example, the data processing system may be configured to predict the temperature for two hours prior to the charge or discharge time period. The data processing system may identify the beginning time of the charge or discharge time period and identify the time two hours prior to the beginning time. In some embodiments, the data processing system may be configured to predict the temperature at an identified time between the identified charge or discharge time period and an immediately previous charge or discharge time period. For example, the data processing system may identify the beginning time of the identified charge or discharge time period and the end time of the immediately previous charge or discharge time period. The data processing system may identify the defined time as a defined time percentage between the two times (e.g., midway between, 25% between, 75% between, etc.). By identifying the time in this manner, the data processing system may factor in external factors such as the environment and/or other charging or discharging time periods when predicting the future temperature of the BESS.

After identifying the time for which to predict the temperature, the data processing system may predict the temperature for the identified time. The data processing system may do so, for example, by factoring any charge or discharge time periods between the current time and the identified future time and/or environmental factors. If there are not any charge or discharge time periods for the BESS between the current time and the identified future time, the data processing system may predict the temperature of the BESS based on an external weather forecast (e.g., a forecast provided by a weather service). The data processing system may do so by executing a thermal model (e.g., a machine learning model or an analytical model) that factors in environmental temperature and/or the current temperature of the BESS to predict a change in temperature (e.g., a heat transfer of the BESS) between the current time and the predicted time in the future. For instance, the data processing system may execute the thermal model according to the following heat transfer algorithm:

$$T(t+\Delta t) = T(t) - Q(t) \times \Delta t / M$$

where $T(t)$ is the temperature at time t, $\Delta t$ is a time interval, $Q(t)$ is the heat outflow rate at time t, and M is the thermal mass of the BESS; and $$Q(t) = (T(t) - T_2(t))/R$$

where $T_2(t)$ is the temperature on the other side of R at time t, and R is a heat transfer thermal resistance value. The data processing system may predict the temperature of the BESS at the identified time as the output of the thermal model.

In cases in which there are one or more charging and/or discharging time periods between the current time and the identified time, the data processing system may predict the temperature of the BESS based on the charge and/or discharge time periods. For example, in some instances, the data processing system may have previously calculated the temperature of the BESS at the end time of the charge or discharge time period for each of the intermittent charge or discharge time periods using the systems and methods described herein. In such instances, the data processing system may identify the predicted temperature of the BESS at the end of the charging or discharging time period immediately prior to the identified time. The data processing system may then execute the model using the forecast environmental temperature of the time between the end time and the identified time and the temperature at the end time to predict the temperature of the BESS at the identified time.

In other instances, the data processing system may not have previously calculated the temperature changes or temperatures of the intermittent charge or discharge time periods. In such instances, the data processing system may execute the thermal model for the time between the current time and the predicted time and input data that corresponds to the environmental factors (e.g., data collected from a weather service) and BESS operating factors, such as heat that is added and/or removed from the BESS during charging or discharging time periods. The data processing system may execute the model using data from the time period to predict the temperature for the identified time.

At operation 412, the data processing system calculates the BESS temperature increase for the charge or discharge time period. The data processing system may calculate the BESS temperature increase for the charge or discharge time period by executing the thermal model described above using data for the charge or discharge time period. For example, the data processing system may calculate the length or duration of the charge or discharge time period by subtracting the beginning time of the charge or discharge time period from the end time of the charge or discharge time period. The data processing system may also retrieve forecast external weather data, such as the forecast temperature, for the charge or discharge time period. The data processing system may input the length of the charge or discharge time period, the forecast external weather data, and an indication of whether the BESS will be charging or discharging into the thermal model. In some embodiments, the data processing system may input other data, such as a charge or discharge rate or an amount of energy discharged during the time period. The data processing system may execute the thermal model with the input data to calculate the BESS temperature increase for the charge or discharge time period.

In another example, the data processing system may calculate the temperature increase of the charge or discharge time period using a set of rules. For example, the data processing system may store indications of average temperature increases over time during charging and discharging of the BESS. The data processing system may identify whether the charge or discharge period is a charging period or a discharging period from the charge/discharge schedule and identify the temperature increase associated with charging or discharging. The data processing system may then identify the length or duration of the charge or discharge time period and calculate the temperature increase according to the average temperature increase over time and the length or duration of the charge or discharge period. In some embodiments, the data processing system may modify the average temperature increase based on a stored factor depending on the amount of energy being charged or discharged (e.g., the temperature of the BESS may increase more over time when the BESS is charging or discharging more energy faster) or charging or discharging more power for the time period. Accordingly, the data processing system may use a rules-based approach to accurately determine a predicted change in temperature during the charge or discharge period.

At operation 414, the data processing system calculates a beginning time of a temperature control time period. The temperature control time period may be a time period in which the data processing system controls equipment (e.g., heating, ventilation, and/or air equipment) to control the temperature of the BESS. For example, the data processing system may change the state of fans and/or a chiller to blow cool air on the BESS to cool the BESS. The data processing system may change the state of such equipment from "off" to "on" at the beginning of the temperature control time period and from "on" to "off" at the end of the time period to control the temperature (e.g., cool) of the BESS for the temperature control time period.

The data processing system may calculate a target temperature of the BESS. The target temperature may be a temperature that the BESS may be at the beginning of the charge or discharge time period such that the temperature of the BESS does not increase above a stored maximum temperature and/or remaining inside of a stored acceptable range while charging or discharging during the charge or discharge time period. For example, the data processing system may retrieve the maximum temperature, the highest temperature of an acceptable range, or a defined percentage (e.g., 80%) of the maximum temperature for the BESS from memory. The data processing system may then subtract the calculated temperature increase from the maximum temperature, the highest temperature of the acceptable range, or the defined percentage to obtain the target temperature. The data processing system may use the retrieved temperature to determine what temperature the BESS should be at the beginning of the charge or discharge time period to avoid overheating the BESS while charging or discharging. The data processing system may thus avoid causing energy loss or damage to the BESS during charging or discharging without concurrently operating temperature control equipment.

The data processing system may calculate the beginning time of the temperature control time period based on the target temperature. To do so, the data processing system may calculate a difference between the current or predicted temperature of the BESS identified at operation 408 or 410 and the target temperature. The data processing system may then retrieve an average temperature change of the BESS when the temperature control equipment is in the "on" state. The data processing system may divide the calculated temperature difference by the average temperature change of the BESS when the temperature control equipment is in the "on" state to calculate a length or duration of the temperature control time period. The data processing system may then subtract the calculated length or duration from the beginning time of the charge or discharge time period to calculate the beginning time of the temperature control time period. The data processing system may store the beginning time in memory with an association with the charge or discharge time period (e.g., the beginning time may be a tag or be in the same line or column as a string identifying the charge or discharge time period in memory).

At operation 416, the data processing system adjusts the state of the equipment at the calculated beginning time of the temperature control time period. For example, the data processing system may maintain an internal clock or calendar. The data processing system may compare the stored beginning time of the temperature control time period to the internal clock or calendar over time. When the internal clock or calendar match the stored beginning time, the data processing system may adjust the state of the equipment. In this way, the stored beginning time may operate as an interrupt that causes the data processing system to control the equipment.

At operation 418, the data processing system measures the new energy requirements for the equipment. The data processing system may measure the new energy requirements by measuring a change in a value of a meter connected to the equipment (e.g., a BESS meter between the equipment and one or both of an energy grid or an RES). The data processing system may adjust the equipment to the "on" state and the data processing system may identify the change in the energy requirements of the equipment as the change in value of the meter. In this way, the data processing system may measure the new energy requirements of the equipment in the "on" state.

At operation 420, the data processing system determines if there is any available clipped energy to use to power the temperature control equipment. The data processing system may do so by identifying the settings of a controller (e.g., the data processing system) that is controlling an RES, such as one or more solar panels. The settings may indicate a maximum amount of energy the RES can provide to a power grid or a load. The data processing system may identify the maximum amount of energy the settings indicate can be generated and the amount of energy the RES is capable of generating (e.g., can generate for the charge or discharge time period based on a forecast of predicted energy production). The data processing system may determine there is available clipped energy by comparing the settings limit to the amount of energy the RES is capable of generating. If the settings limit is lower than the amount of power the RES can generate, the data processing system may determine there is clipped energy available to power the temperature control equipment. Otherwise, the data processing system may determine there is not clipped energy available. In some embodiments, at operation 420, the data processing system determines whether to use clipped energy to power the temperature control equipment by identifying settings in memory.

If the data processing system determines there is not clipped energy available to be used and/or identifies a setting to use energy other than clipped energy to power the temperature control equipment, at operation 422, the data processing system directs available energy to the temperature control equipment. In doing so, the data processing system may direct any of the currently available energy generated by the RES, energy from an energy grid, or the BESS itself to power the temperature control equipment. The data processing system may direct the measured amount of the new energy requirements to enable the temperature control equipment to remain in the "on" state to control the temperature of the BESS for the temperature control time period.

If the data processing system determines there is clipped energy available to be used and/or identifies a setting to use clipped energy to power the temperature control equipment at operation 424, the data processing system may determine if the RES is directing energy to the grid. In some embodiments, the data processing system may make this determination by identifying a setting in memory that indicates whether to take into account power or energy losses that result from energy traveling over a long line between the meter and a meter coupled to a power grid. In some embodiments, the data processing system may identify a charging schedule from memory and determine if the RES is scheduled to deliver power to the grid at the time for which the RES is powering temperature control equipment for the temperature control time period. In some embodiments, the data processing system may determine if the RES is directing energy to the grid by determining the RES is connected to a photovoltaic (PV) meter coupled to a meter at an energy grid (e.g., determine if there is a value in memory that indicates the presence of such a PV meter).

If the data processing system determines the RES is providing energy to the energy grid, at operation 424, at operation 426, the data processing system adjusts a setting limiting the clipped energy from the RES based only on the new energy requirements. The data processing system may do so, for example, by aggregating the new energy requirements to the current energy limit of the RES. The data processing system may aggregate the two values together (in some cases with an added tolerance) and set the new energy limit for the RES to the aggregated value. At operation 428, the data processing system may direct the difference between the aggregated value and the previous energy limit for the RES to the equipment.

If the data processing system determines the RES is providing energy to the energy grid at operation 424, at operation 430, the data processing system identifies the energy loss between a meter (e.g., a PV meter) directly coupled to the RES and measuring incoming and outgoing energy from the RES and a meter (e.g., a grid meter) connected to and measuring incoming and outgoing energy from the energy grid. The energy loss may result from the natural loss of energy as energy travels a long distance on a power line between the RES and the energy grid. The data processing system may identify the energy loss from memory.

At operation 432, the data processing system sets the maximum energy output of the RES based on the energy loss and the new energy requirements. The data processing system may set the maximum energy output by aggregating the new energy requirements and the current energy limit that the data processing system may have previously calculated to account for the energy loss on the power line and setting the limit to the aggregated value, in some cases with a buffer. In some embodiments, the data processing system may aggregate the energy loss, the new energy requirements, and previous energy requirements (e.g., energy the RES was scheduled to provide to the energy grid or to equipment within the energy plant) to determine the aggregated value. At operation 428, the data processing system may direct the difference between the aggregated value and the previous energy limit for the RES to the equipment.

In some instances, the RES may not generate enough previously clipped energy to power the equipment to cool the BESS. For example, the data processing system may determine the amount of previously clipped energy may not be enough to control the temperature of the BESS to reach the target temperature. In this case, the data processing system may calculate a difference between the amount of previously clipped energy and the measured energy the equipment requires. The data processing system may retrieve or direct the calculated difference in energy from the RES, the energy grid, or the BESS (in that order depending on energy availability) to the equipment to sufficiently power the equipment to operate for the energy temperature control time period.

In some embodiments, the data processing system may perform the method 400 to ensure the BESS discharges or charges within a temperature range having an upper and lower boundary. The temperature range may be an optimal temperature range for the BESS in which the BESS may avoid being damaged and/or can most efficiently charge or discharge energy during the charge or discharge time period. The data processing system may ensure the BESS temperature does not exceed the upper boundary using the methods described above. The data processing system may ensure the BESS temperature remains above the lower boundary and/or below the upper boundary by setting the target temperature for charge or discharge time period as the lower boundary or a value between the lower boundary and the upper boundary. The data processing system may then calculate the beginning time of the temperature control time period based on the set target temperature and operate the temperature control equipment accordingly. In some cases, because there is a lower boundary, the data processing system may operate the temperature control equipment to heat the BESS such that the temperature of the BESS remains above the lower boundary during charging and/or discharging.

Figure 5A:
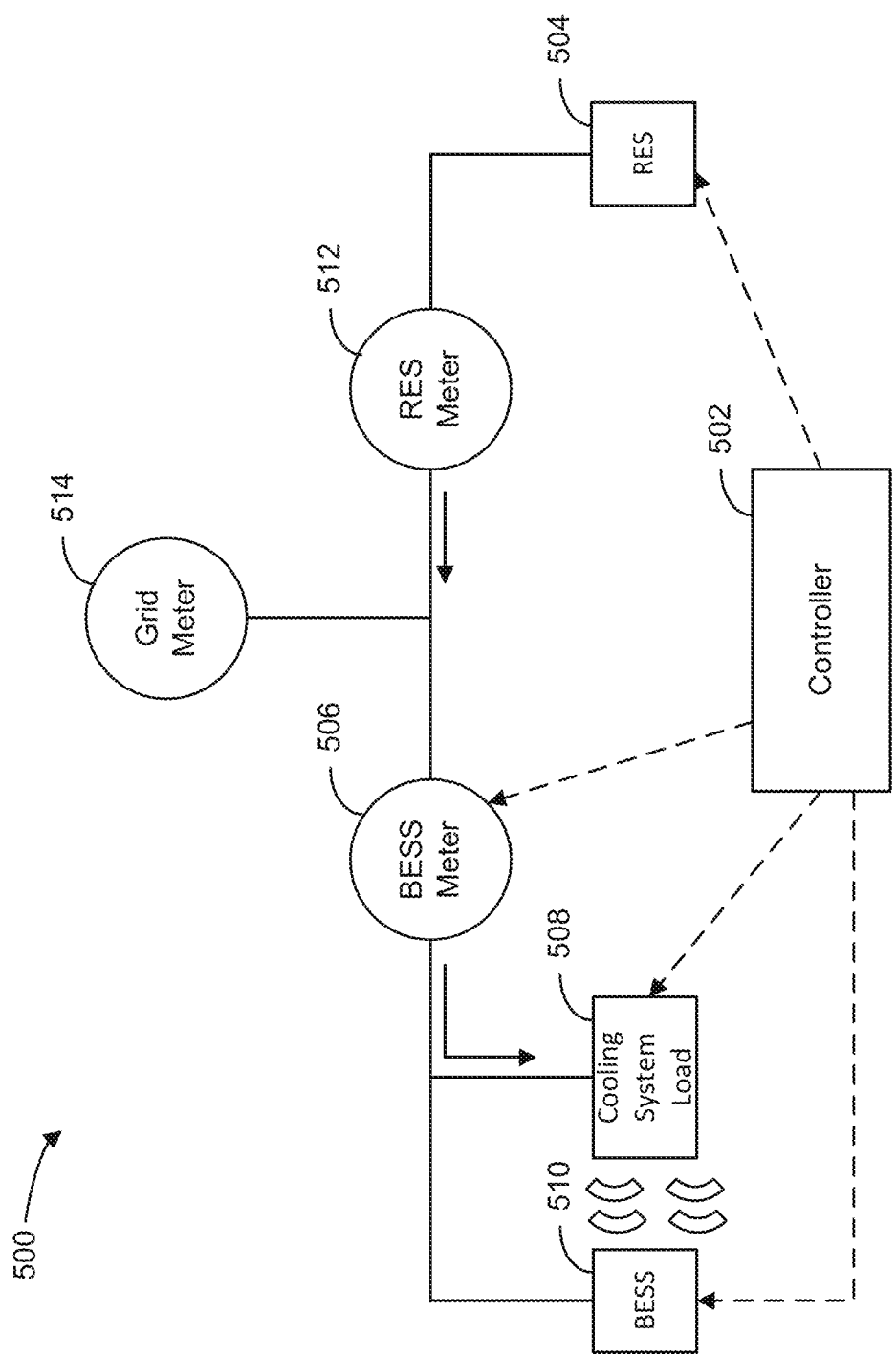
FIGS. 5A and 5B illustrate examples of energy flow from a renewable energy source (RES) to a cooling system load, according to some embodiments.
Figure 5B:
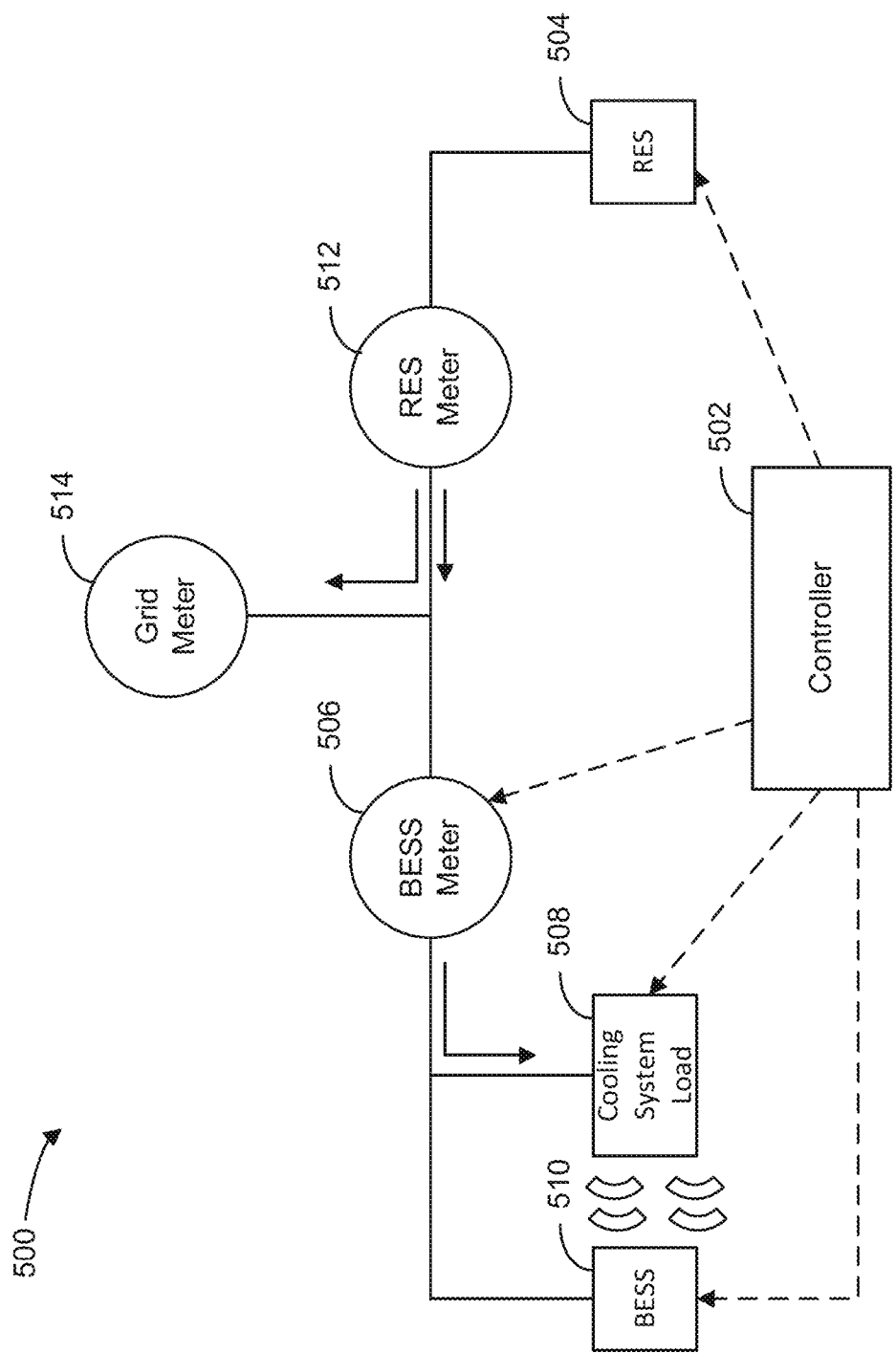

Referring now to FIGS. 5A and 5B, an example of energy flow from a renewable energy source (RES) of a renewable energy plant 500 is shown, according to some embodiments. In the renewable energy plant 500, a controller 502 (e.g., the RES-ESS dispatcher unit 36, the ESS controller 22, the RES SCADA controller 12, the computer 600, the BESS temperature manager 204, etc.) may communicate with a controller controlling an RES 504, a BESS meter 506, and/or a cooling system load 508. The controller 502 may be configured to calculate the temperature control time period such that the cooling system load 508 may cool a BESS 510 prior to a charge or discharge time period of the BESS 510 so the BESS can remain within an acceptable temperature range during the charge or discharge time period.

In some embodiments, as is shown in FIG. 5A, the controller 502 can direct energy to the cooling system load 508 using clipped energy of the RES 504. For example, the controller 502 may control the clipping settings of the RES 504 to reduce the amount of energy that is being clipped from the energy the RES 504 generates. The controller 502 may turn on the cooling system load 508 and measure the new energy requirements of the cooling system load 508 based on a change in reading at the BESS meter 506. The controller 502 may increase the energy limit of the RES 504 by the measured change and direct the previously clipped energy to the cooling system load 508 to power the cooling system load 508 for the temperature control time period.

In some cases, as is shown in FIG. 5B, the controller 502 may adjust the clipping by accounting for energy that is lost between a RES meter 512 and a grid meter 514. Such losses may occur when the RES 504 is configured to provide a set amount of energy to an energy grid, which often involves providing energy over a long power line. For example, the controller 502 may identify the amount of energy the RES 504 is configured to provide to the grid, the expected energy loss from the energy being provided to the grid, the measured difference in load at the BESS meter 506, and/or any other load for which the RES 504 is providing energy. The controller 502 may aggregate each of these values together to identify an amount of energy for provision by the RES 504. The controller 502 may set the limit to the amount of energy the RES 504 can provide by adjusting a setting controlling the limit.

Computing Environment

Having discussed specific embodiments of the present solution, it may be helpful to describe aspects of the operating environment as well as associated system components (e.g., hardware elements) in connection with the methods and systems described herein.

Figure 6A:
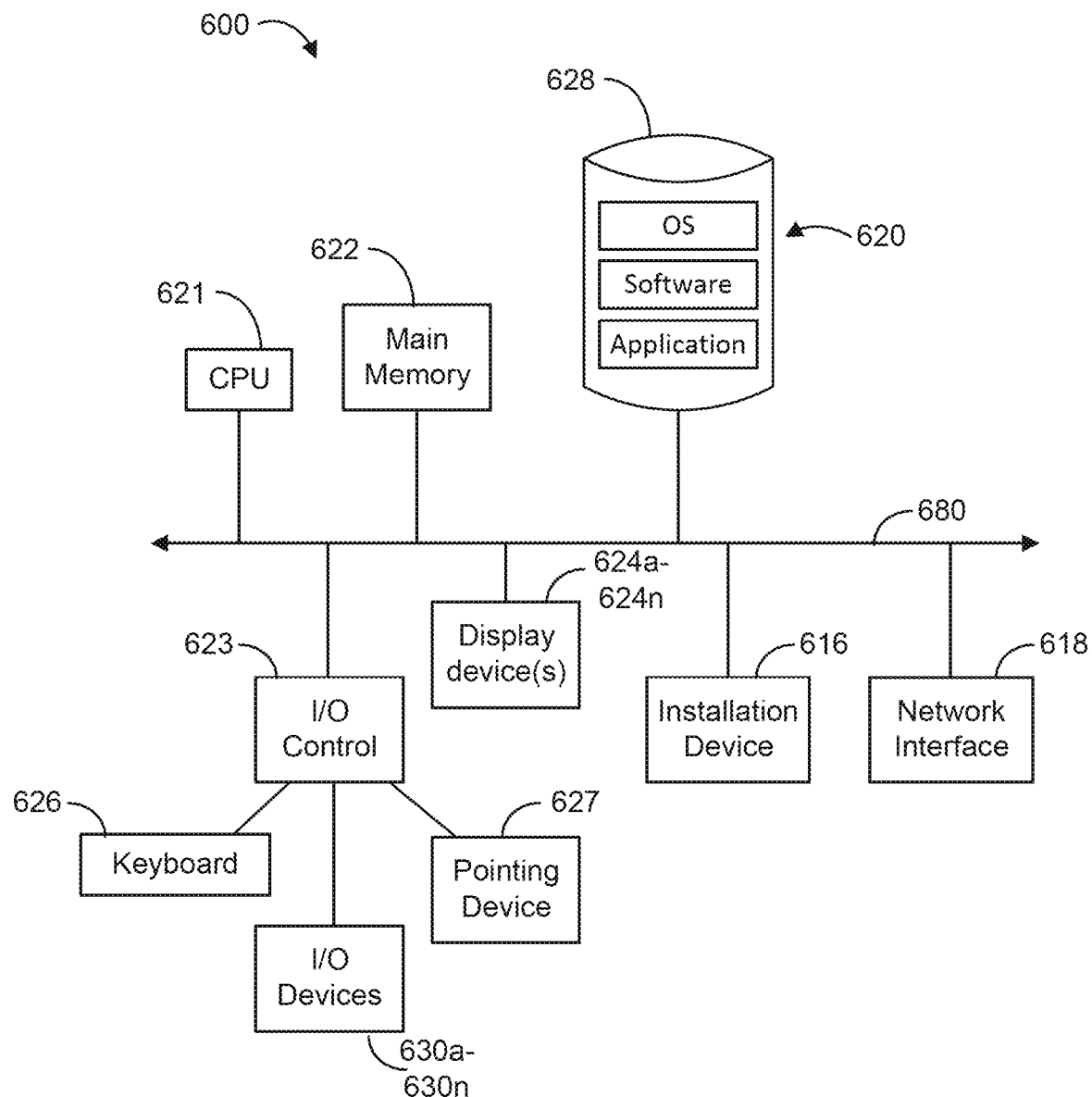
FIGS. 6A and 6B are block diagrams depicting embodiments of computing devices useful in connection with the methods and systems described herein.
Figure 6B:
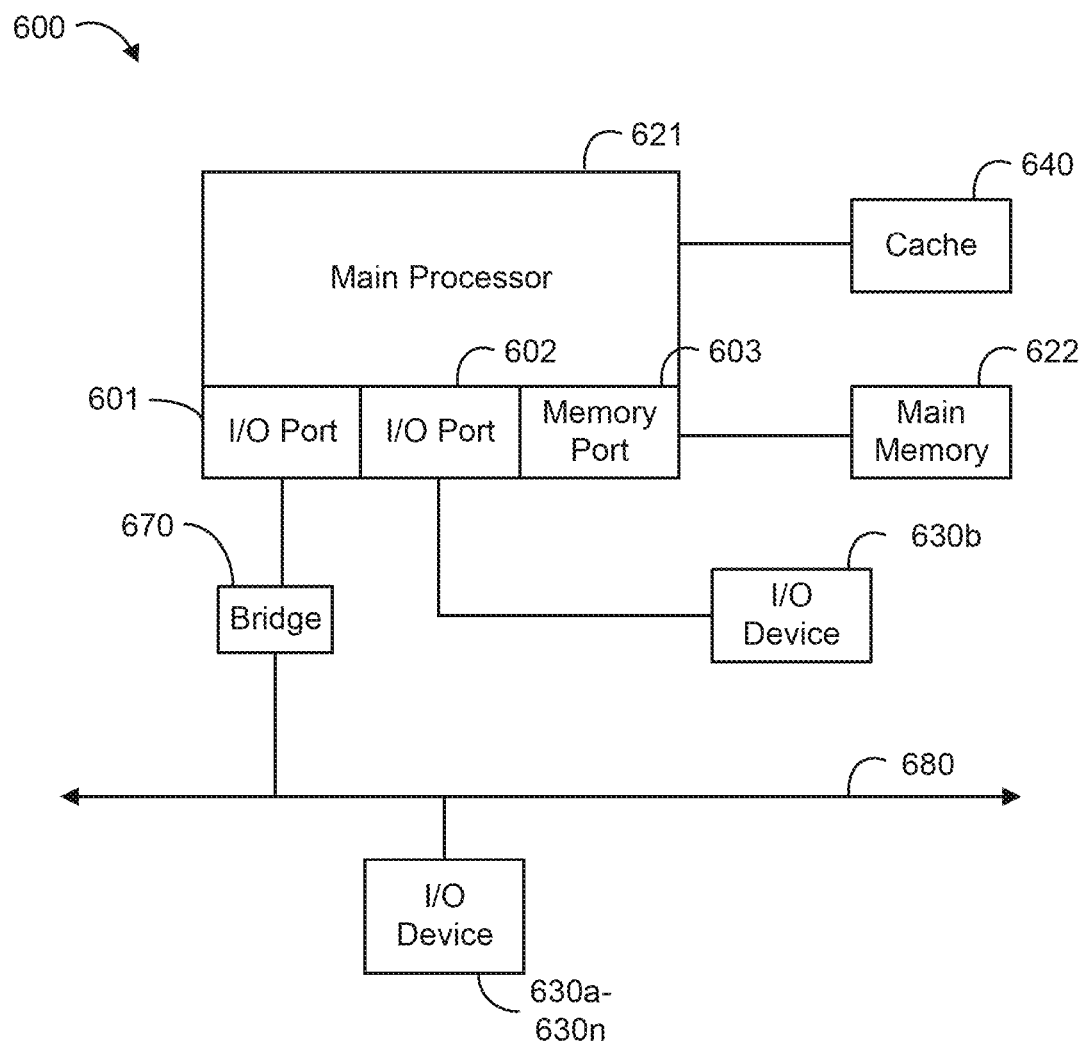

The systems discussed herein may be deployed as and/or executed on any type and form of computing device, such as a computer, network device or appliance capable of communicating on any type and form of network and performing the operations described herein. FIGS. 6A and 6B depict block diagrams of a computing device 600 useful for practicing an embodiment of the systems and methods described herein. As shown in FIGS. 6A and 6B, each computing device 600 includes a central processing unit 621, and a main memory unit 622. As shown in FIG. 6A, a computing device 600 may include a storage device 628, an installation device 616, a network interface 618, an I/O controller 623, display devices 624a-624n, a keyboard 626 and a pointing device 627, such as a mouse. The storage device 628 may include, without limitation, an operating system and/or software. As shown in FIG. 6B, each computing device 600 may also include additional optional elements, such as a memory port 603, a bridge 670, one or more input/output devices 630a-630n (generally referred to using reference numeral 630), and a cache memory 640 in communication with the central processing unit 621.

The central processing unit 621 is any logic circuitry that responds to and processes instructions fetched from the main memory unit 622. In many embodiments, the central processing unit 621 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 600 may be based on any of these processors, or any other processor capable of operating as described herein.

The main memory unit 622 may be one or more memory chips capable of storing data and allowing any storage location to be directly accessed by the central processing unit 621, such as any type or variant of Static random access memory (SRAM), Dynamic random access memory (DRAM), Ferroelectric RAM (FRAM), NAND Flash, NOR Flash and Solid State Drives (SSD). The main memory unit 622 may be based on any of the above described memory chips, or any other available memory chips capable of operating as described herein. In the embodiment shown in FIG. 6A, the central processing unit 621 communicates with main memory unit 622 via a system bus 680 (described in more detail below). FIG. 6B depicts an embodiment of a computing device 600 in which the processor communicates directly with the main memory unit 622 via a memory port 603. For example, in FIG. 6B the main memory unit 622 may be DRDRAM.

FIG. 6B depicts an embodiment in which the central processing unit 621 communicates directly with cache memory 640 via a secondary bus, sometimes referred to as a backside bus. In other embodiments, the central processing unit 621 communicates with cache memory 640 using the system bus 680. Cache memory 640 typically has a faster response time than main memory unit 622 and is provided by, for example, SRAM, BSRAM, or EDRAM. In the embodiment shown in FIG. 6B, the central processing unit 621 communicates with various I/O devices 630 via a local system bus 680. Various buses may be used to connect the central processing unit 621 to any of the I/O devices 630, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 624, the central processing unit 621 may use an Advanced Graphics Port (AGP) to communicate with the display 624. FIG. 6B depicts an embodiment of a computer 600 in which the central processing unit 621 may communicate directly with I/O device 630b, for example via HYPERTRANSPORT, RAPIDIO, or INFINIBAND communications technology. FIG. 6B also depicts an embodiment in which local busses and direct communication are mixed: the central processing unit 621 communicates with I/O device 630a using a local interconnect bus while communicating with I/O device 630b directly.

A wide variety of I/O devices 630a-630n may be present in the computing device 600. Input devices include keyboards, mice, trackpads, trackballs, microphones, dials, touch pads, touch screens, and drawing tablets. Output devices include video displays, speakers, inkjet printers, laser printers, projectors and dye-sublimation printers. The I/O devices may be controlled by an I/O controller 623 as shown in FIG. 6A. The I/O controller may control one or more I/O devices such as a keyboard 626 and a pointing device 627, e.g., a mouse or optical pen. Furthermore, an I/O device may also provide storage and/or an installation device 616 for the computing device 600. In still other embodiments, the computing device 600 may provide USB connections (not shown) to receive handheld USB storage devices such as the USB Flash Drive line of devices manufactured by Twintech Industry, Inc., of Los Alamitos, California.

Referring again to FIG. 6A, the computing device 600 may support any suitable installation device 616, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 600 may further include a storage device, such as one or more hard disk drives or redundant arrays of independent disks, for storing an operating system and other related software, and for storing application software programs such as any program or software 620 for implementing (e.g., configured and/or designed for) the systems and methods described herein. Optionally, any of the installation devices 616 could also be used as the storage device. Additionally, the operating system and the software can be run from a bootable medium.

Furthermore, the computing device 600 may include a network interface 618 to interface to the network 203 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 600 communicates with other computing devices 600' via any type and/or form of gateway or tunneling protocol such as Secure Socket Layer (SSL) or Transport Layer Security (TLS). The network interface 618 may include a built-in network adapter, network interface card, PCMCIA network card, card bus network adapter, wireless network adapter, USB network adapter, modem or any other device suitable for interfacing the computing device 600 to any type of network capable of communication and performing the operations described herein.

In some implementations, the computing device 600 may include or be connected to one or more display devices 624a-624n. As such, any of the I/O devices 630a-630n and/or the I/O controller 623 may include any type and/or form of suitable hardware, software, or combination of hardware and software to support, enable or provide for the connection and use of the display device(s) 624a-624n by the computing device 600. For example, the computing device 600 may include any type and/or form of video adapter, video card, driver, and/or library to interface, communicate, connect or otherwise use the display device(s) 624a-624n. In one embodiment, a video adapter may include multiple connectors to interface to the display device(s) 624a-624n. In other embodiments, the computing device 600 may include multiple video adapters, with each video adapter connected to the display device(s) 624a-624n. In some implementations, any portion of the operating system of the computing device 600 may be configured for using multiple displays 624a-624n. One ordinarily skilled in the art will recognize and appreciate the various ways and embodiments that a computing device 600 may be configured to have one or more display devices 624a-624n.

In further embodiments, an I/O device 630 may be a bridge between the system bus 680 and an external communication bus, such as a USB bus, an Apple Desktop Bus, an RS-232 serial connection, a SCSI bus, a FireWire bus, a FireWire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 600 of the sort depicted in FIGS. 6A and 6B may operate under the control of an operating system, which control scheduling of tasks and access to system resources. The computing device 600 can be running any operating system, such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 600 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 600 has sufficient processor power and memory capacity to perform the operations described herein.

In some implementations, the computing device 600 may have different processors, operating systems, and input devices consistent with the device. For example, in one embodiment, the computing device 600 is a smart phone, mobile device, tablet or personal digital assistant. In still other embodiments, the computing device 600 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 600 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system comprising:
    a processor configured to:
        calculate a projected battery energy storage system (BESS) temperature increase during a charge or discharge time period;
        determine a start time for a temperature control period for controlling temperature of the BESS based on the projected BESS temperature increase reaching a maximum BESS temperature at an end of a charge or discharge period of the BESS;
        determine a target start temperature at a beginning of the charge or discharge period of the BESS;
        send a signal to temperature control equipment; and
        control, based on the signal, the temperature of the BESS during the charge or discharge time period beginning at the start time.

2. The system of claim 1, wherein the projected BESS temperature increase is calculated assuming that the temperature control equipment is operating.

3. The system of claim 1, wherein the processor is further configured to start the temperature control equipment after the beginning of the charge or discharge period of the BESS if the target start temperature is above a current temperature.

4. The system of claim 1, wherein the processor is further configured to start the temperature control equipment before the beginning of the charge or discharge period of the BESS if the target start temperature is below a current temperature.

5. The system of claim 4, wherein the processor is further configured to determine an earliest time when the temperature control equipment can be started, prior to the beginning of the charge or discharge period of the BESS, without causing the BESS temperature to fall below a minimum BESS operating temperature.

6. A method comprising:
    calculating a projected battery energy storage system (BESS) temperature increase during a charge or discharge time period;
    determining a start time for a temperature control period for controlling temperature of the BESS based on the projected BESS temperature increase reaching a maximum BESS temperature at an end of a charge or discharge period of the BESS;
    determining a target start temperature at a beginning of the charge or discharge period of the BESS;
    sending a signal to temperature control equipment; and
    control, based on the signal, the temperature of the BESS during the charge or discharge time period beginning at the start time.

7. The method of claim 6, wherein the BESS temperature increase is calculated assuming that the temperature control equipment is operating.

8. The method of claim 6, further comprising starting the temperature control equipment after the beginning of the charge or discharge period of the BESS if the target start temperature is above a current temperature.

9. The method of claim 6, further comprising starting the temperature control equipment before the beginning of the charge or discharge period of the BESS if the target start temperature is below a current temperature.

10. The method of claim 9, further comprising determining an earliest time when the temperature control equipment can be started, prior to the beginning of the charge or discharge period of the BESS, without causing the BESS temperature to fall below a minimum BESS operating temperature.

11. A non-transitory computer-readable media comprising computer-executable instructions embodied thereon that, when executed by a processor, cause the processor to perform a process comprising:
    calculating a projected battery energy storage system (BESS) temperature increase during a charge or discharge time period;
    determining a start time for a temperature control period for controlling temperature of the BESS based on the projected BESS temperature increase reaching a maximum BESS temperature at an end of a charge or discharge period of the BESS;
    determining a target start temperature at a beginning of the charge or discharge period of the BESS;
    sending a signal to temperature control equipment; and
    control, based on the signal, the temperature of the BESS during the charge or discharge time period beginning at the start time.

12. The non-transitory computer-readable media of claim 11, wherein the BESS temperature increase is calculated assuming that the temperature control equipment is operating.

13. The non-transitory computer-readable media of claim 11, wherein the processor is further configured to start the temperature control equipment after the beginning of the charge or discharge period of the BESS if the target start temperature is above a current temperature.

14. The non-transitory computer-readable media of claim 11, wherein the processor is further configured to start the temperature control equipment before the beginning of the charge or discharge period of the BESS if the target start temperature is below a current temperature.

* * * * *